US007315764B1

(12) United States Patent
Sutardja et al.

(10) Patent No.: US 7,315,764 B1
(45) Date of Patent: *Jan. 1, 2008

(54) INTEGRATED CIRCUIT, METHOD, AND COMPUTER PROGRAM PRODUCT FOR RECORDING AND REPRODUCING DIGITAL DATA

(75) Inventors: Sehat Sutardja, Cupertino, CA (US);
Peter Loc, Santa Clara, CA (US);
Hedley Rainnie, Santa Clara, CA (US);
Eric Janofsky, Sunnyvale, CA (US)

(73) Assignee: Marvell International Ltd, Hamilton (BM)

( * ) Notice: Subject to any disclaimer, the term of this patent is extended or adjusted under 35 U.S.C. 154(b) by 43 days.

This patent is subject to a terminal disclaimer.

(21) Appl. No.: 10/184,299

(22) Filed: Jun. 26, 2002

Related U.S. Application Data

(63) Continuation-in-part of application No. 09/659,693, filed on Sep. 11, 2000.

(60) Provisional application No. 60/211,874, filed on Jun. 14, 2000.

(51) Int. Cl.
*G06F 17/00* (2006.01)

(52) U.S. Cl. .................................... 700/94

(58) Field of Classification Search ............ 700/94, 700/500–504; 716/16, 17; 712/32, 35, 36, 712/37

See application file for complete search history.

(56) References Cited

U.S. PATENT DOCUMENTS 3,878,514 A    4/1975  Faber (Continued)

FOREIGN PATENT DOCUMENTS

EP    0 982 732 A1    3/2000

(Continued)

OTHER PUBLICATIONS

IEEE P802. 11i/D10.0, Apr. 2004 (Amendment to ANSI/IEEE Std 802.11-1999 (2003 Reaff) edition as amended by IEEE Std 802.11g-2003 and IEE Std 802.11h-2003); IEEE Standard for Information technology - Telecommunications and information exchange between systems - Local and metropolitan area networks - Specific requirements; Part 11: Wireless Medium Access Control (MAC) and Physical Layer (PHY) specifications: Amendment 6: Medium Access Control (MAC) Security Enhancements; LAN/MAN Committee of the IEEE Computer Society; 184 pages.

(Continued)

*Primary Examiner*—Sinh Tran
*Assistant Examiner*—Andrew C Flanders

(57) ABSTRACT

An integrated circuit to control a media player/recorder having a wireless receiver, a storage device, and an output circuit, wherein the wireless receiver receives a signal representing encoded media data, and a method and computer program product for same. It comprises a processor comprising a digital signal processor, and a storage controller responsive to the digital signal processor to store the encoded media data in the storage device; a read channel responsive to the storage controller to read the encoded media data from the storage device; wherein the digital signal processor comprises a decoder to decode the retrieved encoded media data; and a digital-to-analog converter to convert the media data decoded by the decoder to an analog signal, wherein the analog signal is output to the output circuit.

81 Claims, 22 Drawing Sheets

U.S. PATENT DOCUMENTS

| | | | |
|---|---|---|---|
| 4,897,630 | A | 1/1990 | Nykerk |
| 5,083,122 | A | 1/1992 | Clark |
| 5,148,546 | A * | 9/1992 | Blodgett .................... 713/320 |
| 5,479,151 | A | 12/1995 | Lavelle et al. |
| 5,511,000 | A * | 4/1996 | Kaloi et al. ................. 704/201 |
| 5,552,766 | A | 9/1996 | Lee et al. |
| 5,682,142 | A | 10/1997 | Loosmore et al. |
| 5,687,325 | A | 11/1997 | Chang |
| 5,724,475 | A | 3/1998 | Kirsten |
| 5,727,231 | A | 3/1998 | Bartley et al. |
| 5,818,389 | A * | 10/1998 | Lazar ......................... 342/383 |
| 5,825,202 | A | 10/1998 | Tavana et al. |
| 5,880,775 | A | 3/1999 | Ross |
| 5,903,871 | A * | 5/1999 | Terui et al. ................. 704/500 |
| 5,917,405 | A | 6/1999 | Joao |
| 6,011,666 | A | 1/2000 | Wakamatsu |
| 6,061,306 | A | 5/2000 | Buchheim |
| 6,111,580 | A | 8/2000 | Kazama et al. |
| 6,118,269 | A | 9/2000 | Davis |
| 6,119,091 | A * | 9/2000 | Huang et al. ............... 704/500 |
| 6,181,994 | B1 | 1/2001 | Colson et al. |
| 6,233,393 | B1 * | 5/2001 | Yanagihara et al. ........ 386/125 |
| 6,271,752 | B1 | 8/2001 | Vaios |
| 6,281,790 | B1 | 8/2001 | Kimmel et al. |
| 6,289,099 | B1 | 9/2001 | Edgar, III |
| 6,292,108 | B1 | 9/2001 | Straser et al. |
| 6,308,253 | B1 * | 10/2001 | Gadre et al. .................. 712/41 |
| 6,332,175 | B1 * | 12/2001 | Birrell et al. ............... 711/112 |
| 6,334,025 | B1 * | 12/2001 | Yamagami ................... 386/96 |
| 6,389,423 | B1 | 5/2002 | Sakakura |
| 6,441,731 | B1 | 8/2002 | Hess |
| 6,476,858 | B1 | 11/2002 | Ramirez Diaz et al. |
| 6,496,692 | B1 * | 12/2002 | Shanahan ................... 455/418 |
| 6,516,039 | B1 * | 2/2003 | Taura et al. ................. 375/354 |
| 6,553,404 | B2 | 4/2003 | Stern |
| 6,618,812 | B2 * | 9/2003 | Seiler et al. ................ 713/300 |
| 6,624,750 | B1 | 9/2003 | Marman et al. |
| 6,671,343 | B1 | 12/2003 | Ito |
| 6,697,103 | B1 | 2/2004 | Fernandez et al. |
| 6,727,811 | B1 | 4/2004 | Fendis |
| 6,763,182 | B1 * | 7/2004 | Endo et al. ................. 386/124 |
| 6,772,212 | B1 | 8/2004 | Lau et al. |
| 6,859,831 | B1 | 2/2005 | Gelvin et al. |
| 6,867,683 | B2 | 3/2005 | Calvesio et al. |
| 6,950,946 | B1 | 9/2005 | Droz et al. |
| 6,970,081 | B1 | 11/2005 | Cheng |
| 6,975,220 | B1 | 12/2005 | Foodman et al. |
| 2002/0019925 | A1 | 2/2002 | Dewhurst et al. |
| 2002/0167590 | A1 | 11/2002 | Naidoo et al. |
| 2005/0128068 | A1 | 6/2005 | Winick et al. |

FOREIGN PATENT DOCUMENTS

| | | |
|---|---|---|
| EP | 0 999 549 A2 | 5/2000 |
| WO | WO 99/48296 A1 | 9/1999 |

OTHER PUBLICATIONS

ANSI/IEEE Std 802.11, 1999 Edition; Information technology - Telecommunications and information exchange between systems - Local and metropolitan area networks - Specific requirements - Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999)[Adopted by ISO/IEC and redesignated as ISO/IEC 8802-11: 1999/Amd 1:2000(E)]; Supplement to IEE Standard for Information technology - Telecommunications and information exchange between systems - Local and metropolitan area networks - Specific requirements - Part 11: Wireless LAN Medium Access Control (MAC) and Physical Layer (PHY) specifications High-Speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology - Telecommunications and information exchange between systems - Local and metropolitan area networks - Specific requirements - Part 11: Wireless LAM Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor 1-2001 (Corrigendum to IEEE Std 802.11-1999); IEEE Standard for Information technology - Telecommunications and information exchange between systems - Local and metropolitan area networks - Specific requirements - Part 11: Wireless Lan Medium Access Control (MAC) and Physical Layer (PHY) specifications Amendment 2: Higher-Speed Physical Layer (PHY) extension in the 2.4 GHz Band - Corrigendum 1; LAN/MAN Standards Committee of the IEEE Computer Society; Nov. 7, 2001; 24 pages.

IEEE P802.11g/D8.2, Apr. 2003 (Supplement to ANSI/IEEE Std 802.11-1999(Readd 2003)); Draft Supplement to Standard [for] Information Technology - Telecommunications and information exchange between systems - Local and metropolitan area networks - Specific requirements - Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h - 2003 (Amendment to IEEE Std 802.11, 1999 Edition (Reaff 2003)); as amended by ITTT Stds 802.11a-1999, 802.11b-1999, 802.11b-1999/Cor 1-2000, 802.11d-2001, and 802.11g-2003; IEEE Standard for Information technology - Telecommunications and information exchange between systems - Local and metropolitan area networks - Specific requirements - Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

Settles, Curtis; DSP-Augmented CPU cores Promise Performance Boost for Ultra-Compact Drives, Data Storage, May 2000, pp. 35-38, PennWell, US.

Quantum, Part 2: A Closer Look at Hard Disk Drives; Chapter 3: Inside Hard Disk Drives, Quantum Online, Jun. 7, 2000, pp. 1-3, Ouantum, US.

Quantum, Chapter 4: Recent Technological Developments: The Impact of Leading-Edge Technology on Mass Storage, Quantum Online, Jun. 7, 2000, pp. 1-3, Quantum, US.

* cited by examiner

INTEGRATED CIRCUIT, METHOD, AND COMPUTER PROGRAM PRODUCT FOR RECORDING AND REPRODUCING DIGITAL DATA

CROSS-REFERENCE TO RELATED APPLICATIONS

This application is a continuation-in-part of U.S. Non-Provisional patent application Ser. No. 09/659,693 entitled "Apparatus And Method For Recording And Reproducing Digital Data," filed Sep. 11, 2000, the disclosure thereof incorporated by reference herein in its entirety.

This application claims priority under 35 U.S.C. § 119(e) to U.S. Provisional Patent Application Ser. No. 60/211,874, entitled "Method And Apparatus For Recording And Reproducing Digital Data," filed Jun. 14, 2000, the disclosure thereof incorporated by reference herein in its entirety.

BACKGROUND

The present invention relates generally to an apparatus for recording and reproducing digital data. More particularly, the present invention relates to a media player/recorder, having a miniature hard disk drive for storing the digital data.

FIG. 1 is an example of a conventional MP3 player. MP3 player includes an interface 106, nonvolatile solid state memory 102, a decoder 110, a digital-to-analog (D/A) converter 147, an audio output 116, a key pad 108, a display 112, a controller 104, RAM 144 and ROM 145.

Controller 104 controls the operation of the MP3 player in accordance with a set of programmed instructions. Programmed instructions for controller 104 are stored in non-volatile memory or ROM 145, and RAM 144 is provided as the working memory for controller 104

Typically, MP3 data, which is a digital compressed format representing music data, is initially stored on a personal computer 50 and is subsequently transferred to the MP3 player via interface 106, under control of controller 104. The MP3 data is stored in nonvolatile solid state memory 102. Interface 50 can be implemented by a standard parallel port, serial port, USB and the like. Nonvolatile solid state memory 102 may be implemented as flash memory. Generally, for a music quality recording, a nonvolatile solid state memory having 64 Mbytes can store about 1 hour of music. Flash memory provides the capability of retaining the stored digital data even when the MP3 player is powered down. Once the digital data has been transferred to the MP3 player, it no longer needs to be connected to personal computer 50, and the MP3 player can play back the MP3 data autonomously from personal computer 50.

Decoder 110 functions to decode and decompress the MP3 data file stored in nonvolatile solid state memory 102. Decoder 110 decompresses the MP3 music file in accordance controller 104 according to the MP3 format, and decodes the decompressed music file into a bit stream form. The bit stream is then converted into analog form by digital to analog converter 147 for connection to a speaker, earphone and the like. A decoding program for the MP3 decoder function is stored in the ROM 145 and loaded to RAM 144 by controller 104 as required.

The MP3 player comprises a keypad 108 for allowing user control and interaction with the MP3 player. Such control may include power on/power off, music selection and volume. The MP3 also comprises a display 112 for displaying characters or graphics, such as a battery indicator, a play mode indicator, a volume indicator, available memory size and the title of the music being played.

SUMMARY

In general, in one aspect, the invention features an integrated circuit to control a media player/recorder having a wireless receiver, a storage device, and an output circuit, wherein the wireless receiver receives a signal representing encoded media data, and a method and computer program product for same. It comprises a processor comprising a digital signal processor, and a storage controller responsive to the digital signal processor to store the encoded media data in the storage device; a read channel responsive to the storage controller to read the encoded media data from the storage device; wherein the digital signal processor comprises a decoder to decode the retrieved encoded media data; and a digital-to-analog converter to convert the media data decoded by the decoder to an analog signal, wherein the analog signal is output to the output circuit.

Particular implementations can include one or more of the following features. The media data is encoded by a process that compresses the media data; and the encoded media data is decoded by a process that decompresses the encoded media data. The storage device stores a process for decoding the encoded media data for a selected code. The digital signal processor determines a code of the encoded media data retrieved by the digital signal processor; the process for decoding the encoded media data is retrieved from the storage device in accordance with the determined code; and the decoder decodes the encoded media data in accordance with the retrieved process. The media player/recorder has an input circuit to receive unencoded media data, the digital signal processor comprises an encoder to encode the unencoded media data; and the encoded media data encoded by the digital signal processor is stored on the storage device. The media player/recorder has a wireless transmitter, and wherein the digital signal processor causes the wireless transmitter to transmit the encoded media data while the analog signal is output to the output circuit. the storage device stores a list of identifiers of desired encoded media selections; the wireless receiver receives a signal representing an identifier of an offered encoded media selection; and the digital signal processor causes the storage device to store the offered encoded media selection when the identifier of the offered encoded media selection corresponds to the identifier of one of the desired encoded media selections. The media player/recorder has a wireless transmitter, and wherein the digital signal processor causes the wireless transmitter to transmit a signal representing the identifiers of the desired encoded media selections. The media player/recorder has a wireless transmitter, wherein the storage device stores a list of identifiers of shared encoded media selections stored on the storage device; wherein the wireless receiver receives a signal representing a request for a sought encoded media selection, the request including an identifier of the sought encoded media selection; wherein the digital signal processor causes the wireless transmitter to transmit one of the shared encoded media selections when the identifier of the sought encoded media selection corresponds to the identifier of the one of the shared encoded media selections. The digital signal processor causes the wireless transmitter to transmit a signal representing the identifiers of the shared encoded media selections. The media player/recorder receives a signal representing biometric data; and the digital signal processor causes the storage device to store the biometric data. The media player/recorder has an interface, and wherein the digital signal processor causes the interface to transmit a signal representing the biometric data stored on the storage device. The media player/recorder has a display unit, the storage device stores a list of desired items of interest; the wireless receiver receives a signal representing an offered item of interest; the digital signal processor causes the display unit to indicate a match when the offered item of interest corresponds to one of the desired items of interest. The media player/recorder has a directional antenna, wherein the digital signal processor uses the directional antenna to determine a direction to a transmitter of the signal representing the offered item of interest; and wherein the digital signal processor causes the display unit to display the direction. The media player/recorder has a wireless transmitter, and wherein the digital signal processor causes the wireless transmitter to transmit contact information to the transmitter of the signal representing the offered item of interest. The digital signal processor causes the wireless transmitter to transmit a signal representing the desired items of interest. The integrated circuit is implemented within a digital camera having an image sensor; the digital signal processor encodes image data representing an image captured by the image sensor; and the storage controller stores the encoded image data on the storage device. The digital camera further comprises a display; the storage controller retrieves the encoded image data from the storage device; the digital signal processor decodes the retrieved encoded image data; and the media player/recorder sends a signal representing the decoded image data to the display. The digital camera is a digital motion picture camera and the encoded image data represents a motion picture.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears. Like reference numerals refer to like parts.

DETAILED DESCRIPTION

The present invention is directed to a media player/recorder apparatus, and in particular one that is portable. As used herein the term media player/recorder apparatus refers to an audio and/or video play back and recording apparatus. In general, audio and/or video analog data is first digitized and compressed using one of a variety of formats and recorded in the media player/recorder for subsequent play back thereby. During playback the digitized data is decompressed and converted to an analog signal. Additionally while the preferred format for compressing audio data is known as MP3, the present invention is independent of the compression format and not limited to MP3. The compression format therefore may include any other suitable compression format, such as, by way of example, EPAC™, QDesign Music playback, AAC, Liquid Audio, MS Audio, Dolby Digital, and the like.

While implementation of the present invention are discussed in terms of data compression such as MP3, the invention is not limited to data compression, but includes other forms of data encoding that may or may not include data compression. In implementations where the data encoding includes data compression, the media data is encoded by a process that compresses the media data, and the encoded media data is decoded by a process that decompresses the encoded media data.

Figure 1:
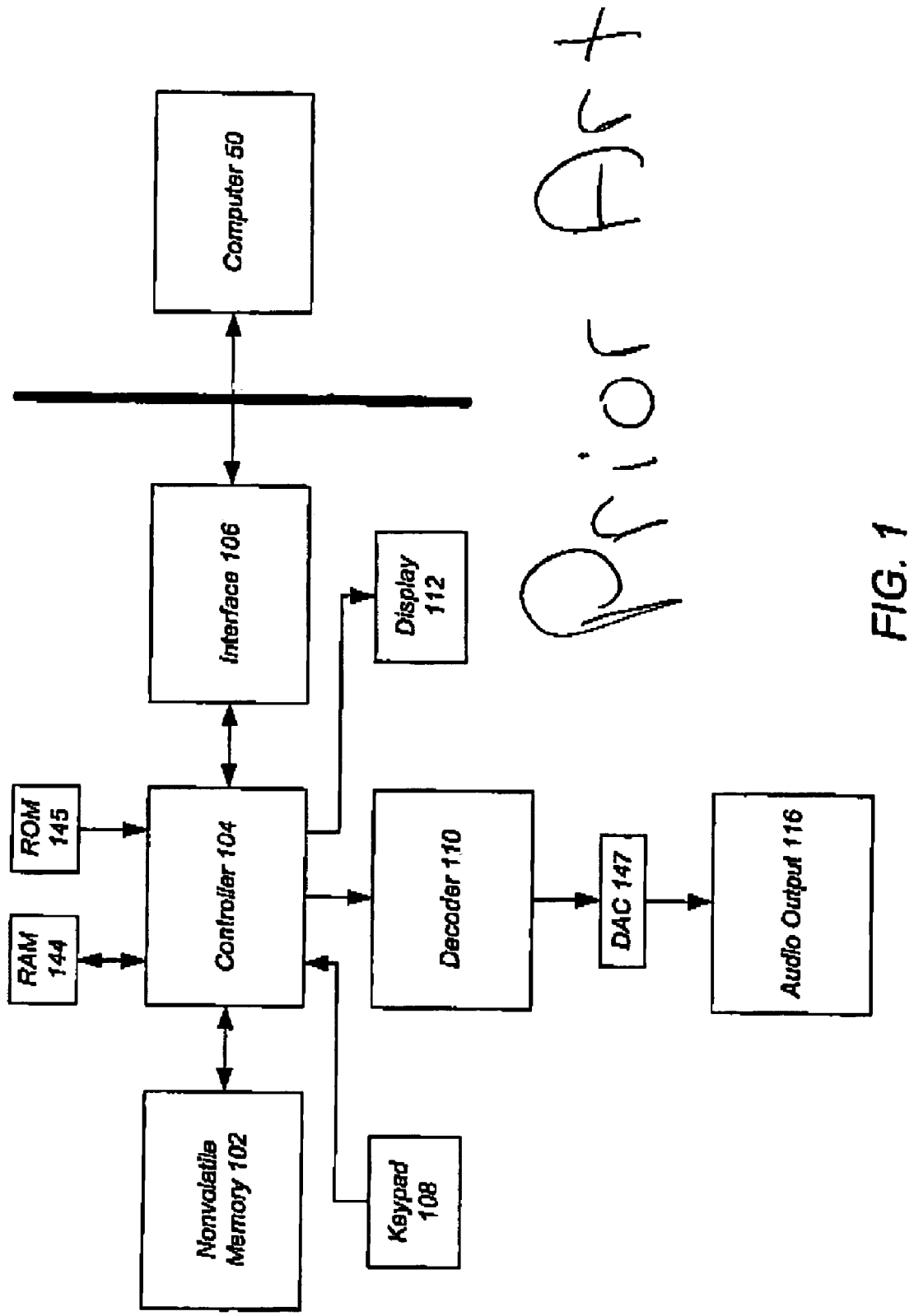
FIG. 1 is a block diagram of a conventional MP3 player.
Figure 2:
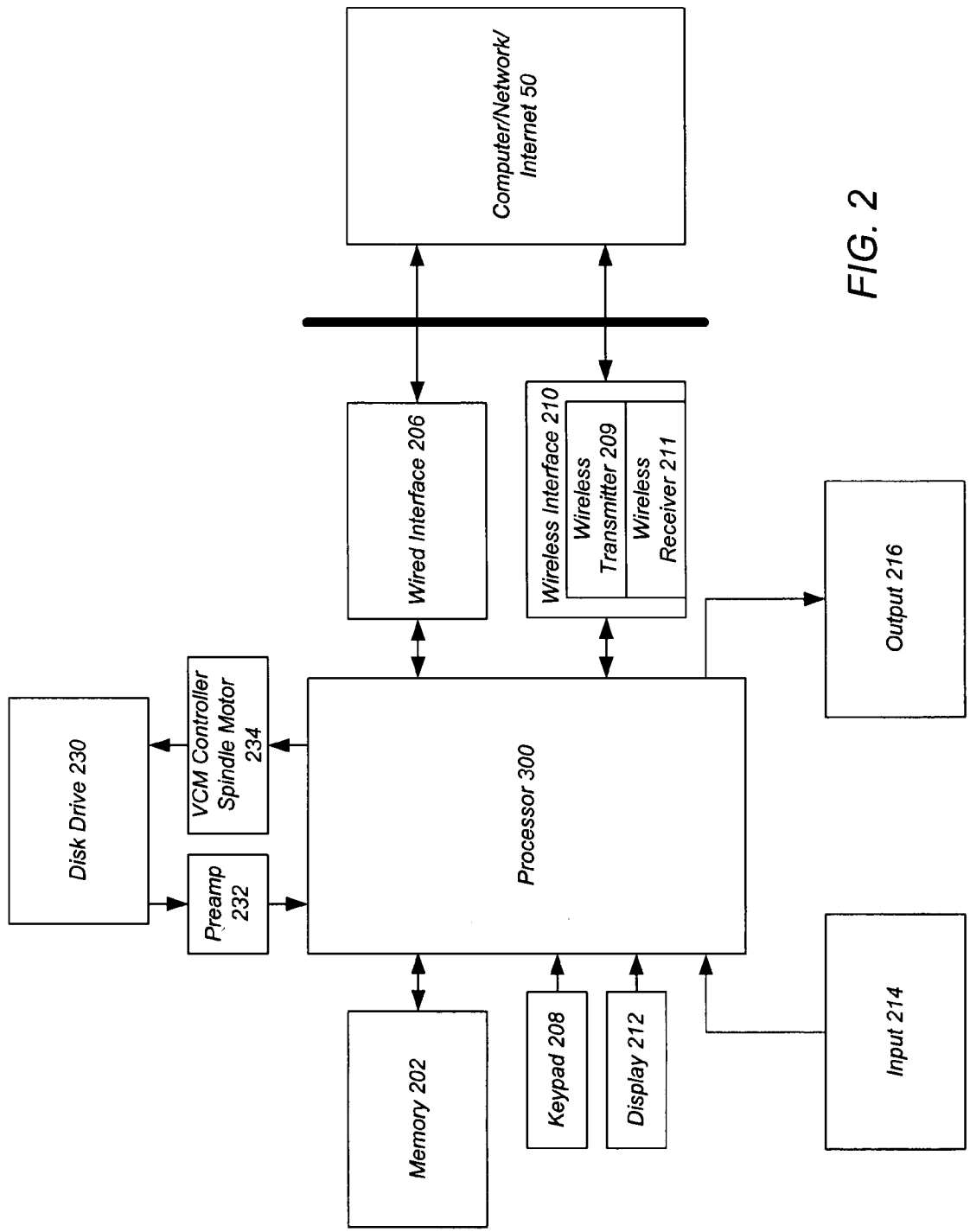
FIG. 2 is a block diagram of a first embodiment of a media player/recorder in accordance with the present invention.

Referring to FIG. 2 there is shown the first embodiment of media player/recorder of the present invention. The media player/recorder includes a wired interface 206, a wireless interface 210, memory 202, a processor 300, an output 216, a keypad 208, a display 212, a storage device (the storage device may utilize, for example, a magnetic media (such as a hard disk drive), magneto-optical media, an optical media (such as a CD ROM, CDR, CDRW or the like), and the like) such as, a disk drive 230, a preamp 232 and a voice coil motor (VCM) 234. Wireless interface 210 includes a wireless transmitter 209 and a wireless receiver 211.

The operation of the media player/recorder is as follows. Operation of the media player/recorder is controlled by the user through keypad 208. Status of the media player/recorder is provided to the user by display 212.

Media data, which was previously digitized, may be obtained (downloaded) from a personal computer, network appliance, local area network, Internet 50 and the like, including wireless networks with infrastructure, such as a designated access point, peer-to-peer wireless networks, and the like. Such external devices communicate with the media player/recorder via wired interface 206 and wireless interface 210, which are controlled by processor 300. Wired interface 206 may be implemented, for example, as a parallel interface, serial interface, USB, Ethernet connection, IEEE 1394 (a.k.a. Firewire), and the like. Wireless interface 210 may be implemented, for example, as an infrared interface, IEEE 802.15, IEEE 802.11, Bluetooth™ and the like. Again the present invention is independent of the interface selected. Media data is then stored on the storage device such as, disk drive 230 in accordance with processor 300. Disk drive 230 is preferably a miniature drive with a capacity of 1 Gbyte of data storage, which is particularly suitable for a portable device. Of course, any other appropriate sized disk drive may be employed.

Alternatively, media data may be obtained directly from an external analog source, such as a microphone or video camera, connected to input 214. Input 214 takes the input signal from external device and sets the analog signal to an appropriate level. The analog signal is then converted to a digital signal and compressed using a selected format by processor 300, as will be described herein below. The compressed digital data is similarly stored on disk drive 230.

When the user chooses a selection of media data to be played back with keypad 208, processor 300 powers up disk drive 230 and retrieves the selected data which is then transferred to memory 202. It is noted that the powering up of the device is done in a sequential manner so as to minimize energy consumption of the device. A more detailed description is provided below.

Memory 202 comprises a solid state memory, such as, for example dynamic random access memory (solid state memory), flash memory, EEPROM, or the like. It is not necessary for memory 202 to be nonvolatile since the media data is stored in a nonvolatile manner on storage device or disk drive 230. The quantity of solid state memory required is less than is required in a conventional MP3 player. The quantity of solid state memory contemplate is about 2 Mbytes, which is sufficient to store about 2 minutes of MP3 data. Of course, as will be appreciated by one of ordinary skill in the art, when dealing with video data, more solid state memory may be required. The amount of solid state memory supplied is selected to minimize energy consumption.

After the selected data is stored in memory 202, disk drive 230 is then powered down. In this manner, during playback disk drive 230 is powered up only during the transfer of the selected media data from disk drive 230 to memory 202, which results in lower energy consumption. A more detailed description of the powering down of disk drive 230 is provided herein below. The media data is retrieved from memory 202. Processor 300 determines the format of data compression from the retrieved data. Disk drive 230, also stores the data compression/decompression algorithms. The data is decompressed in accordance with the determined format and converted to an analog signal by processor 300. The analog signal is set to an appropriate level by output circuit 216. If the analog signal contains audio data, output circuit 216 is connected to a speaker, headphone and the like for playback, and if the analog signal contains video data, output circuit 216 is connected to a display device for playback.

Additionally, media data recorded on disk drive 230 or stored in memory 202 may be transferred (uploaded) to a personal computer, network appliance, local area network, internet 50 or another media player/recorder through interfaces 206 and 210 under the control of processor 300.

Figure 3:
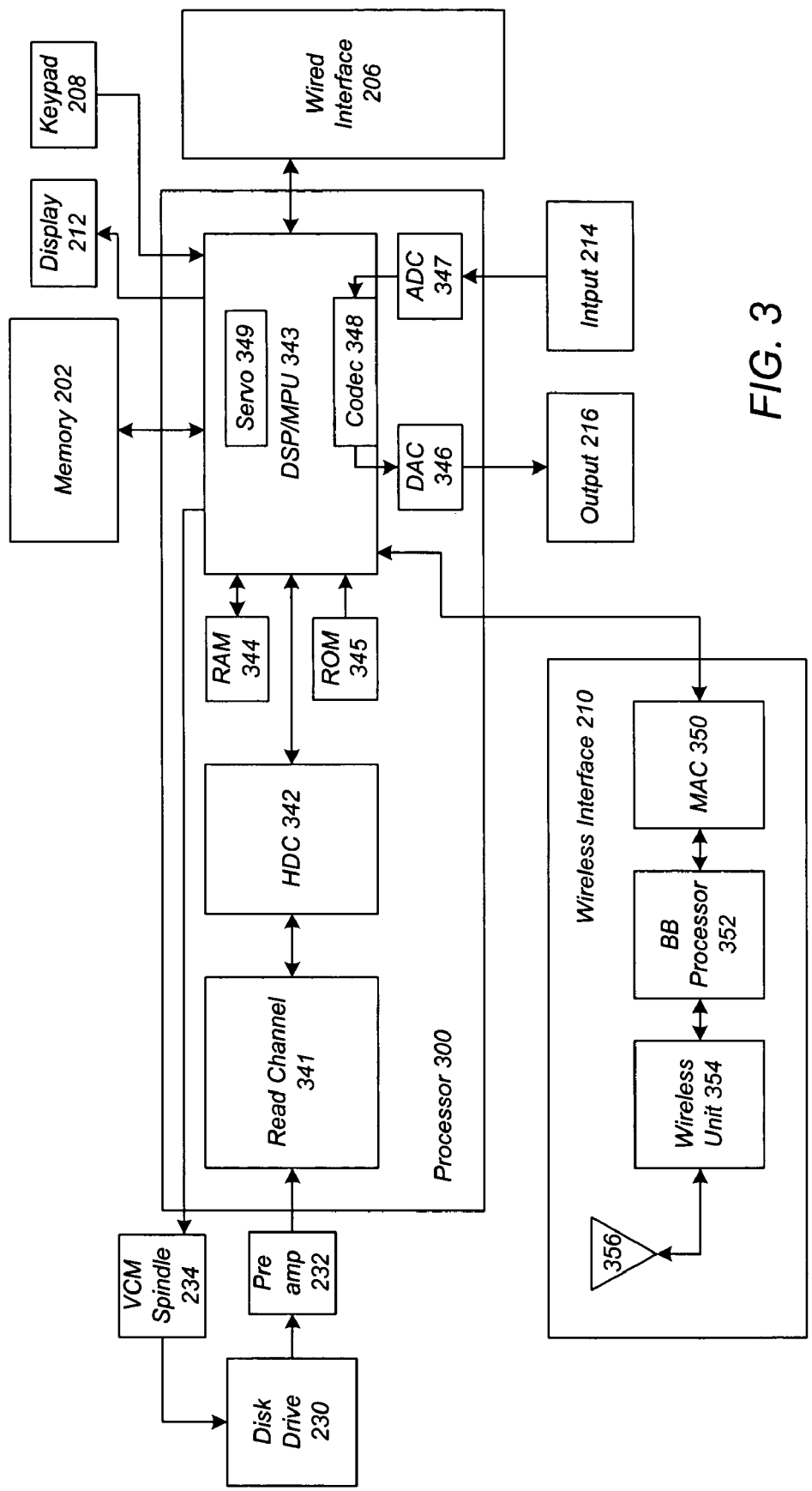
FIG. 3 is a more detailed block diagram of a first embodiment of the media player/recorder of FIG. 2.

FIG. 3 is a detailed block diagram of processor 300. Processor 300 is preferably implemented as a single integrated circuit. A media playback/recorder apparatus having a processor implemented as a single integrated circuit can be fabricated at lower cost and have lower energy consumption. Alternatively, processor 300 may be implemented by discrete components. Processor 300 comprises a read channel 341, storage controller or hard disk controller 342, digital signal processor/microprocessor unit (DSP/MPU) 343, random access memory (RAM) 344, a non volatile memory such as read only memory (ROM) 345, digital to analog converter (DAC) 346 and analog to digital converter (ADC) 347. DSP/MPU 343 comprises servo controller 349 and Codec 348. In a preferred embodiment, DSP/MPU 343 is implemented as a single integrated circuit. In another embodiment, MPU may be implemented as one integrated circuit and the DSP may be implemented as another integrated circuit.

It is noted that DSP/MPU 343 may comprise a microprocessor unit, a digital signal processor, or any combination thereof. ROM 345 stores programmed instructions for processor 300 and DSP/MPU 343 to control the operation of both the disk drive 230 (and associated circuitry) and the signal processing of the media data. RAM 345 is provided as a working memory for DSP/MPU 343. For each of the various compression formats discussed above, the decompression and compression algorithms for Codec 348 are stored on disk drive 230. Storing the decompression and compression algorithms on disk drive 230 minimizes the size of ROM 345 and its energy consumption. Additionally, this feature allows future compression and decompressions formats to be easily implemented for the media player/recorder.

In the implementation of FIG. 3, wireless interface 210 is implemented separately from processor 300, and includes an antenna 356, a wireless unit 354, a baseband processor 352, and a media access controller (MAC) 350. Antenna 356 is a conventional antenna for receiving and transmitting wireless signals. Wireless unit 354 converts wireless signals received by antenna 356 to analog baseband signals, and converts analog baseband signals received from baseband processor 352 to wireless signals for transmission by antenna 356. Baseband processor 352 converts analog baseband signals received from wireless unit 354 to a digital bitstream, and converts a digital bitstream received from MAC 350 to analog baseband signals, both according to well-known methods. MAC 350 frames the digital bitstream produced by baseband processor 352, and filters the frames to select the frames addressed to processor 300, both according to well-known methods. MAC 350 also converts frames received from processor 300 to a digital bitstream for baseband processor 352, also according to well-known methods. In some implementations, MAC 350 includes an embedded microprocessor.

Figure 6:
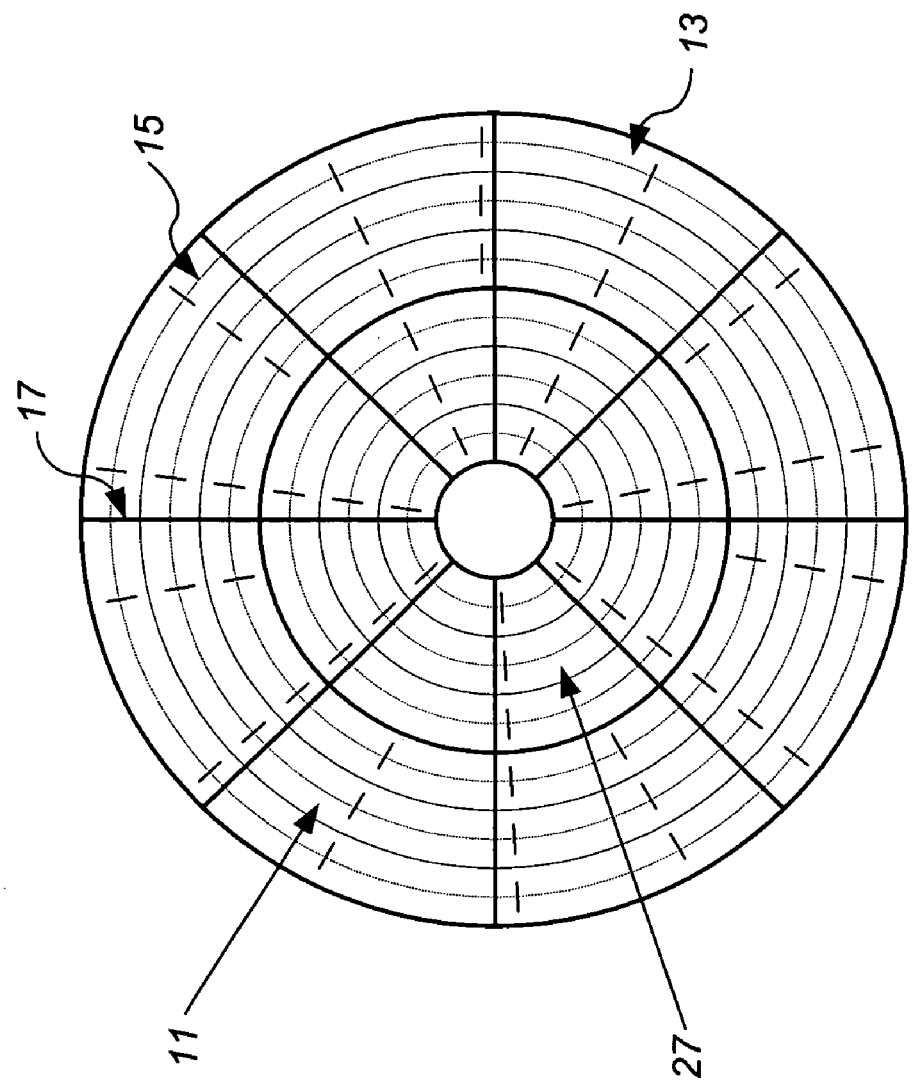
FIG. 6 shows an exemplary data format of a magnetic disk having a plurality of concentric tracks comprised of a plurality of user data sectors and embedded servo data sectors.

Prior to discussing the operation of processor 300, reference is made to FIG. 6. FIG. 6 shows an exemplary data format of a magnetic media used in disk drive 230, comprising a series of concentric data tracks 13 wherein each data track 13 comprises a plurality of sectors 15 with embedded servo wedges 17. Servo controller 349 processes the servo data in servo wedges 17 and, in response thereto, positions the read/write head over a desired track. Additionally, servo controller 349 processes servo bursts within servo wedges 17 to keep a disk head of disk drive 230 aligned over a centerline of the desired track while writing and reading data. Servo wedges 17 may be detected by the discrete time sequence detector implemented in DSP/MPU 343. It is important to note that DSP/MPU 343 is utilized only during the time period for detecting servo wedges 17; during other periods DSP/MPU 343 is available to perform other functions as described below, such as signal processing for media data playback and recording. By using only one DSP rather than two, the cost of fabrication and the amount of energy consumption can be reduced.

As described above, the powering up of the device is done in a sequential manner so as to minimize energy consumption of the device. More specifically, the mechanical or motor portions of the storage device are energized first. After the motor reaches operating speed, VCM 234 is energized, followed by the energization of read channel 341 and HDC 342.

The operation of processor 300 is as follows. DSP/MPU 343 controls the entire operation of the media player/recorder. DSP/MPU 343 is coupled to hard disk controller 342. When writing data to disk drive 230, hard disk controller 342 receives a write instruction and write data from DSP/MPU 343. The write data is temporarily stored in a cache memory (not shown) which is used as a buffer memory. Based on a clock from a clock generator (not shown), DSP/MPU 343 controls voice coil motor (VCM) and spindle motor 234 via-servo unit 349. As a result, the magnetic head is moved to a desired track position on the magnetic disk by the head arm, and the magnetic disk is rotated at a rated rotational speed by the spindle, which is driven by spindle motor 234. The data is read from the cache memory and supplied to read channel 341 via hard disk controller 342. Read channel 341 encodes the write data under the control of DSP/MPU 343, and supplies the encoded write data to preamplifier 232. The magnetic head writes the encoded write data on the magnetic disk in accordance with a signal from preamplifier 232.

When reading data from the magnetic disk, hard disk controller 342 receives a read instruction from DSP/MPU 343. Based on a clock signal, DSP/MPU 343 controls voice coil motor and spindle motor 234 via servo unit 349. Hence, the magnetic head is moved to a desired track position on the magnetic disk by the head arm, and the magnetic disk is rotated by spindle motor 234.

The data read from the magnetic disk by the magnetic head is supplied to read channel 341 via preamplifier 232. Read channel 341 decodes the read data under the control of DSP/MPU 343, and generates read data. The read data are supplied from read channel 341 to hard disk controller 342 under the control of DSP/MPU 343, and are temporarily stored in the cache memory. The read data read from the cache memory are supplied to DSP/MPU 343 from hard disk controller 342.

As noted above, operation of the media player/recorder is controlled by the user through keypad 208, which is in communication with DSP/MPU 343. Status of the media player/recorder is provided to the user by display 212 in accordance with DSP/MPU 343. When either uploading or downloading data, the media player/recorder is in communication with personal computer, network appliance, local area network, Internet 50. Otherwise the media player/recorder can be operated independently. The user selects the file to be downloaded from personal computer, network appliance, local area network, Internet 50 by way of keypad 208. Alternatively the user can select the file to be downloaded from the personal computer. DSP/MPU 343 controls the flow of data through interfaces 206 and/or 210 and stores the data onto hard disk 230 in accordance with the method described above. When uploading data to personal computer, network appliance, local area network, Internet 50 the process is reversed.

To record data directly input into media player/recorder from an external analog source, the external device is placed in communication with input 214. Input 214 takes the input signal from the external device and sets the analog signal to an appropriate level. The analog signal is then converted to a digital signal by ADC 347 of processor 300. Codec 348 of DSP/MPU 343 compresses the digitized data using a default compression format or one selected by the user by way of keypad 208. The default or selected compression program is transferred from hard disk 230 to RAM 344 and provided to Codec 348 for encoding. The compressed digital data is similarly stored on disk drive 230 under the control of DSP/MPU 343.

When the user chooses a selection of media data to be played back with keypad 208, DSP/MPU 343 powers up disk drive 230 and retrieves the selected data as described above. The retrieved data is then written to memory 202. After the selected data is stored in memory 202, disk drive 230 is then powered down by DSP/MPU 343. In this manner, during playback disk drive 230 is powered up only during the transfer of the selected media data from disk drive 230 to memory 202, which results in lower energy consumption. A single song stored in MP3 format may take approximately one second to retrieve from disk drive 230. The media data is retrieved from memory 202 by DSP/MPU 343 and the compression format is then determined.

If the decompression program has already been transferred to RAM 344, the program is provided to Codec 348. Otherwise the decompression algorithm is retrieved from hard disk 230 and transferred to RAM 344. The data is then decompressed by Codec 348 and converted to an analog signal by DAC 346. The analog signal is set to an appropriate level by output circuit 216. If the analog signal contains audio data, output circuit 216 is connected to a speaker, headphone and the like for playback, and if the analog signal contains video data, output circuit 216 is connected to a display device for playback.

It is noted that the capacity of disk drive 230 is selected to hold a desired amount of media data, and the amount of solid state memory 202 is selected to minimize energy consumption. A disk drive having a capacity of 1 Gbyte can store approximately 30 hours of MP3 compressed music.

This section will described the power management control of the device by CPU/MPU 343.

Figure 7:
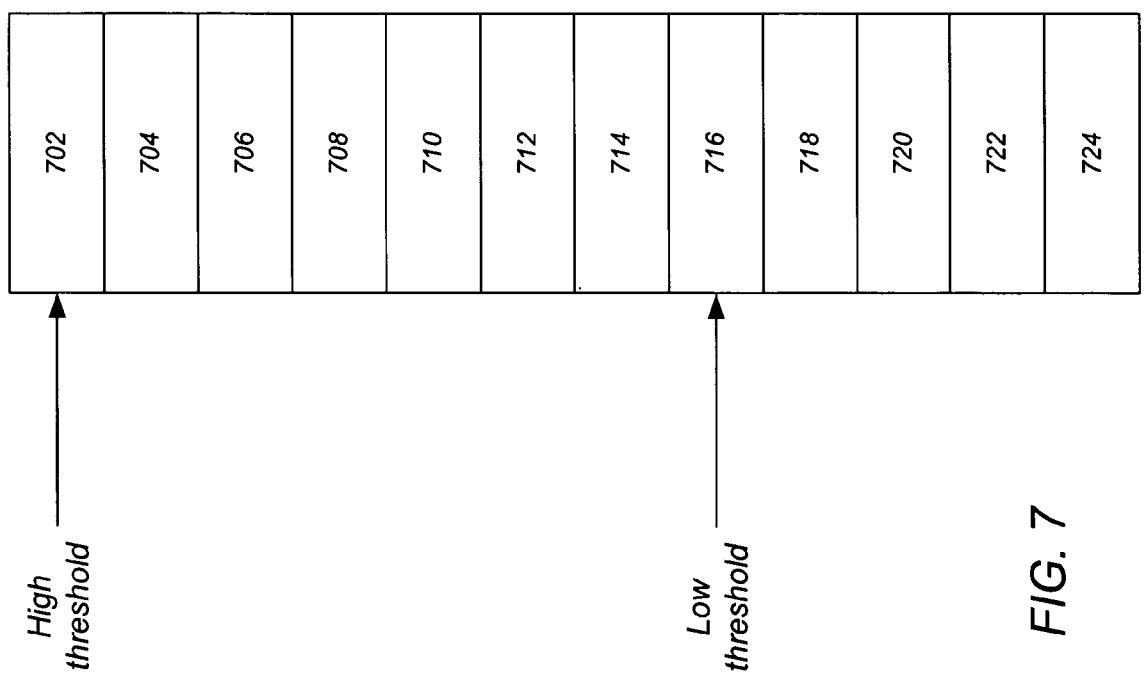
FIG. 7 is a schematic representation of memory 202.
Figure 9:
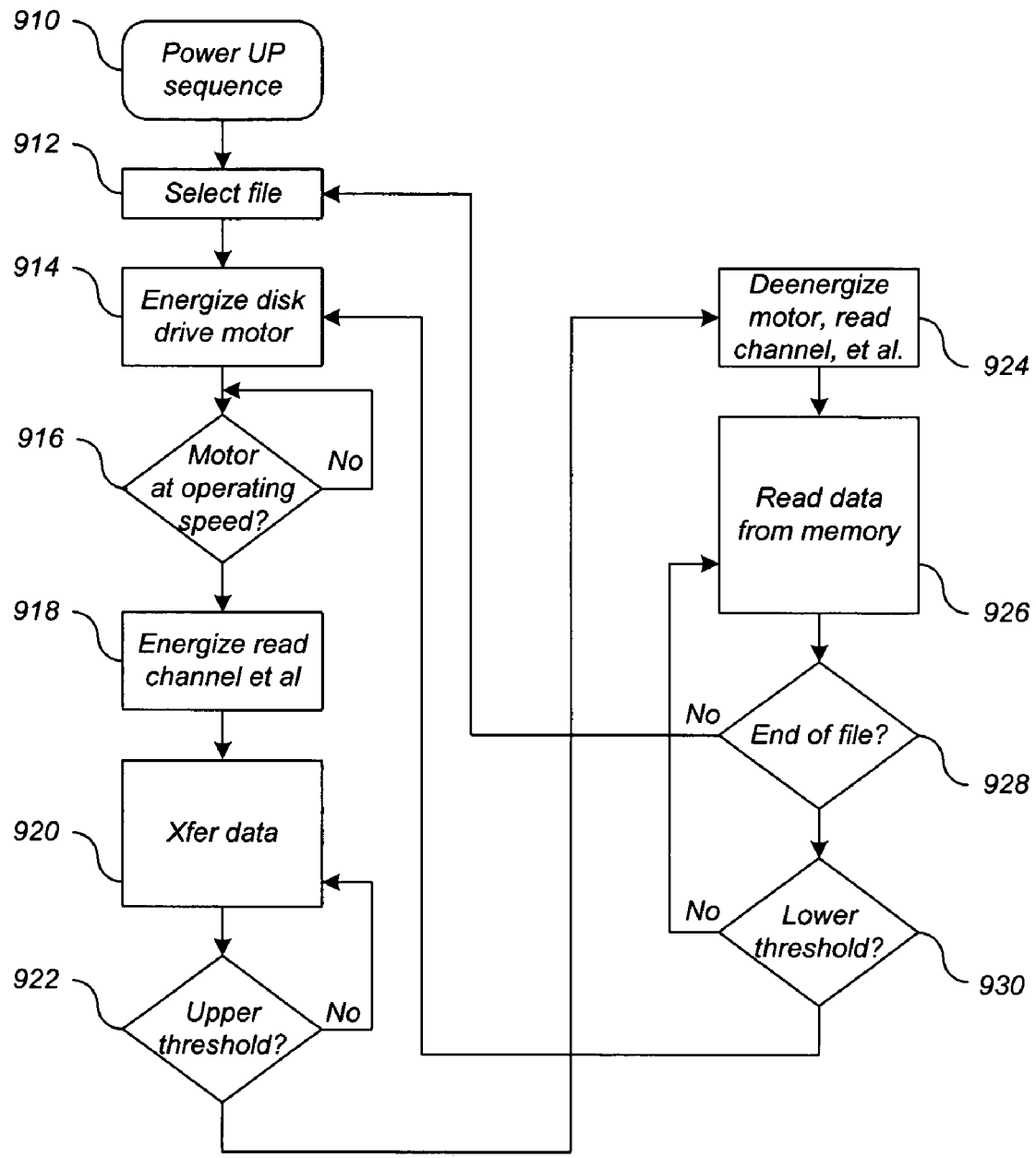
FIG. 9 is flow chart of an energization/deenergization procedure according to a first embodiment of the present invention.

Referring now to FIGS. 3, 7 and 9, when the user turns on the media player and selects a file to be played (step 912), the various components of media player are powered up in a sequential manner so as to minimize energy consumption of the device. More specifically, the mechanical or motor portions of the storage device or disk drive 230 are energized first (step 914). After the motor reaches its operating speed (step 916), VCM 234, preamp 232, read channel 341 and HDC 342 are energized, since these components are only functional after disk drive 230 becomes operational. Energy would be unnecessarily expended if preamp 232, read channel 341 and HDC 342 were energized before disk drive 230 becomes operational. Therefore, VCM 234, preamp 232, read channel 341 and HDC 342 are energized only after disk drive 230 becomes operational (step 918). Preamp 232, read channel 341 and HDC 342 can be referred to as a storage circuit and include circuits to transform data stored on a storage device to a digital signal.

FIG. 7 is a schematic representation of memory 202. User data is first stored from location 724 to location 702 in a sequential manner in memory 202. In one embodiment, DSP/MPU 343 uses a pointer system in connection with memory 202 to determine when the amount of data stored the amount data stored reaches an upper threshold value (step 922). When the amount of data stored in memory 202 reaches the upper threshold value, HDC 342, read channel 341, preamp 232, disk drive 230 and VCM 234 are powered down or deenergized (step 924). Of course, as will be appreciated by one of ordinary skill in the art, while data is being to memory 202, data may also be read contemporaneously therefrom by DSP/MPU 343 for decompression and playback. Data is then read out from memory 202 starting at location 702 towards location 724 by DSP/MPU 343 (step 926). When the data file has been completely read from memory (step 928), the user can select another file. The data is continually read from memory 202, until the amount of data remaining is below a low threshold value (step 930). When the data remaining in memory 202 is below the threshold value, disk drive 230, VCM 234, preamp 232, read channel 341 and HDC 342 are sequentially energized as noted above, and data is transferred from the storage device to memory 202.

Figure 10:
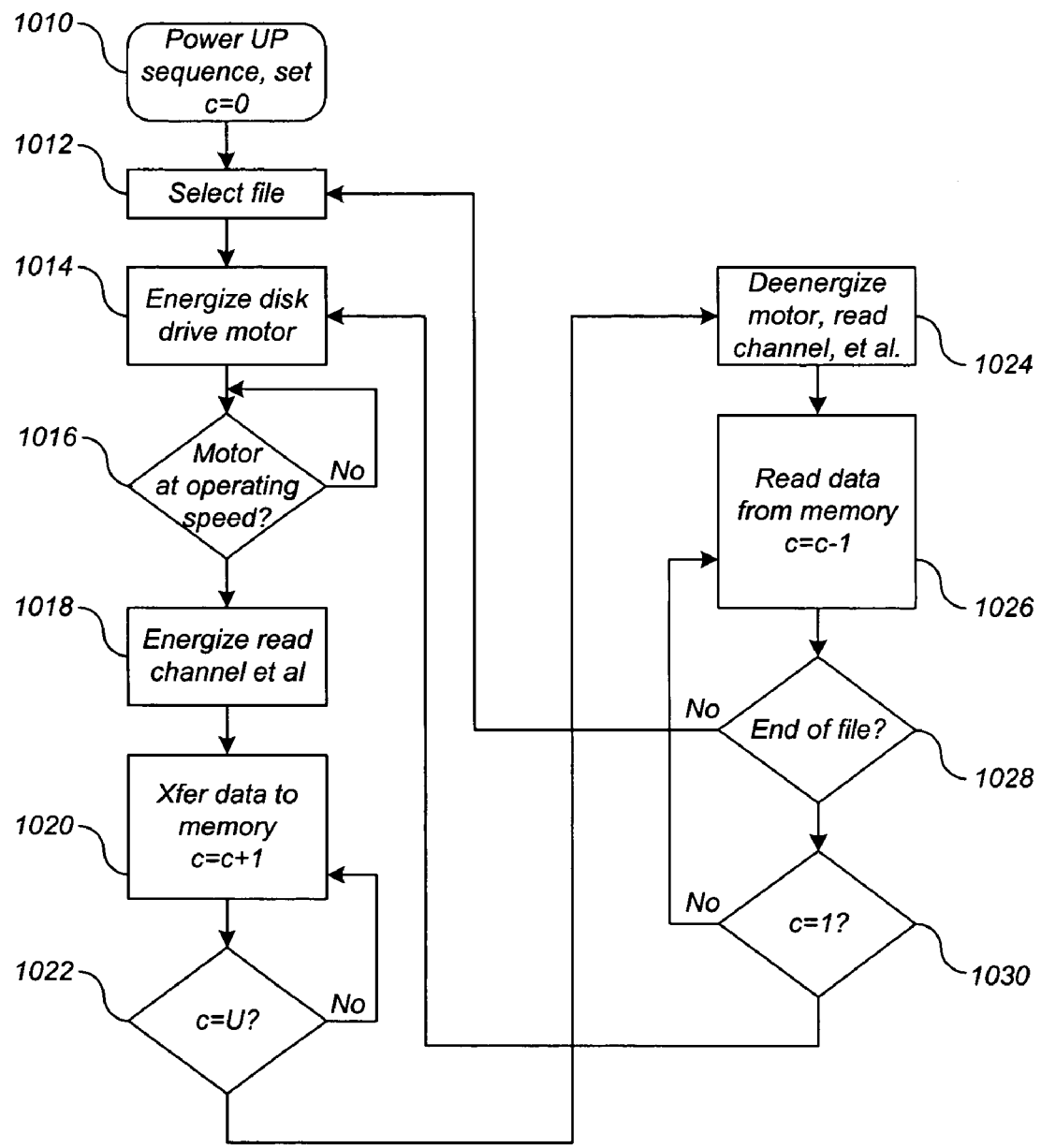
FIG. 10 is flow chart of an energization/deenergization procedure according to a second embodiment of the present invention.

FIG. 10 is an alternate embodiment to FIG. 9. Instead of utilizing a pointer system, the amount of data transferred to memory 202 is counted (step 1020) by a counter incorporated in DSP/MPU 343. The sequential energization of the disk drive 230, VCM 234, preamp 232, read channel 341 and HDC 342 is similar to that of the embodiment of FIG. 9 (steps 1012, 1014, 1016 and 1018). When amount of data transfer to memory 202 is greater than or equal to an upper limit U (step 1022), HDC 342, read channel 341, preamp 232, disk drive 230 and VCM 234 are powered down or deenergized (step 1024). As data is read from memory, the counter decrements the count, and when the count is less than or equal to a lower limit 1 (step 1030), disk drive 230, VCM 234, preamp 232, read channel 341 and HDC 342 are sequentially energized as noted above, and data is transferred from the storage device to memory 202.

Figure 11:
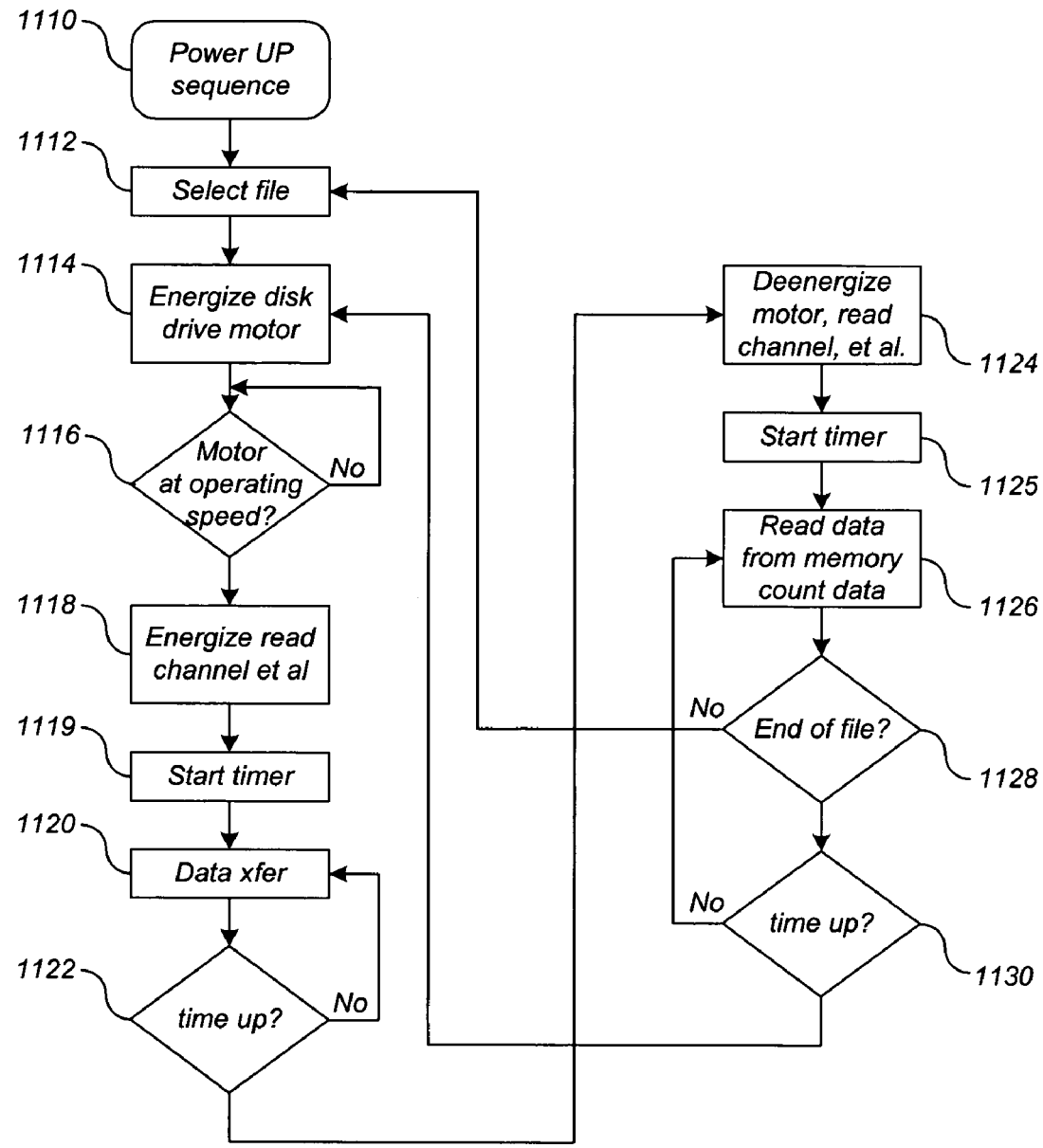
FIG. 11 is flow chart of an energization/deenergization procedure according to a third embodiment of the present invention.

FIG. 11 is another alternate embodiment to FIG. 9. The embodiment in FIG. 9 utilizes a timer incorporated in DSP/MPU 343 to approximate the amount of data transferred to memory 202 in accordance with the data transfer rate of disk drive 230. The sequential energization of disk drive 230, VCM 234, preamp 232, read channel 341 and HDC 342 is similar to that of the embodiment of FIG. 9 (steps 1112, 1114, 1116 and 1118). The timer is started (step 1119) as data is transferred form disk drive 230 to memory 202. When the timer times out, HDC 342, read channel 341, preamp 232, disk drive 230 and VCM 234 are powered down or deenergized (step 1124). As data is read from memory, the timer is started (1125), and when the timer times out (step 1130), disk drive 230, VCM 234, preamp 232, read channel 341 and HDC 342 are sequentially energized as noted above, and data is transferred from the storage device to memory 202.

Figure 8:
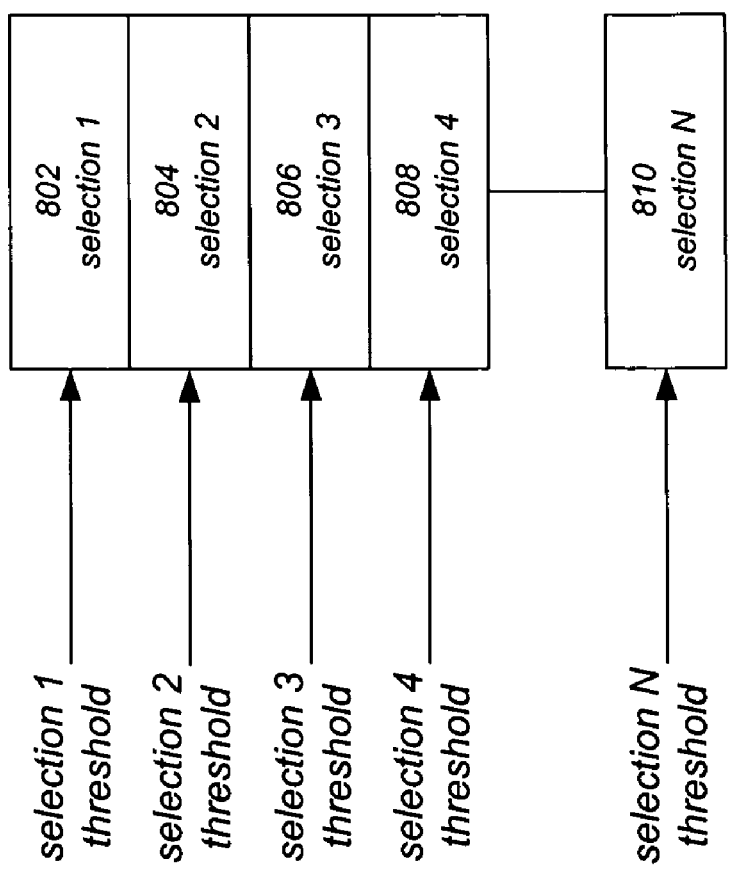
FIG. 8 is a memory map of memory 202.
Figure 12:
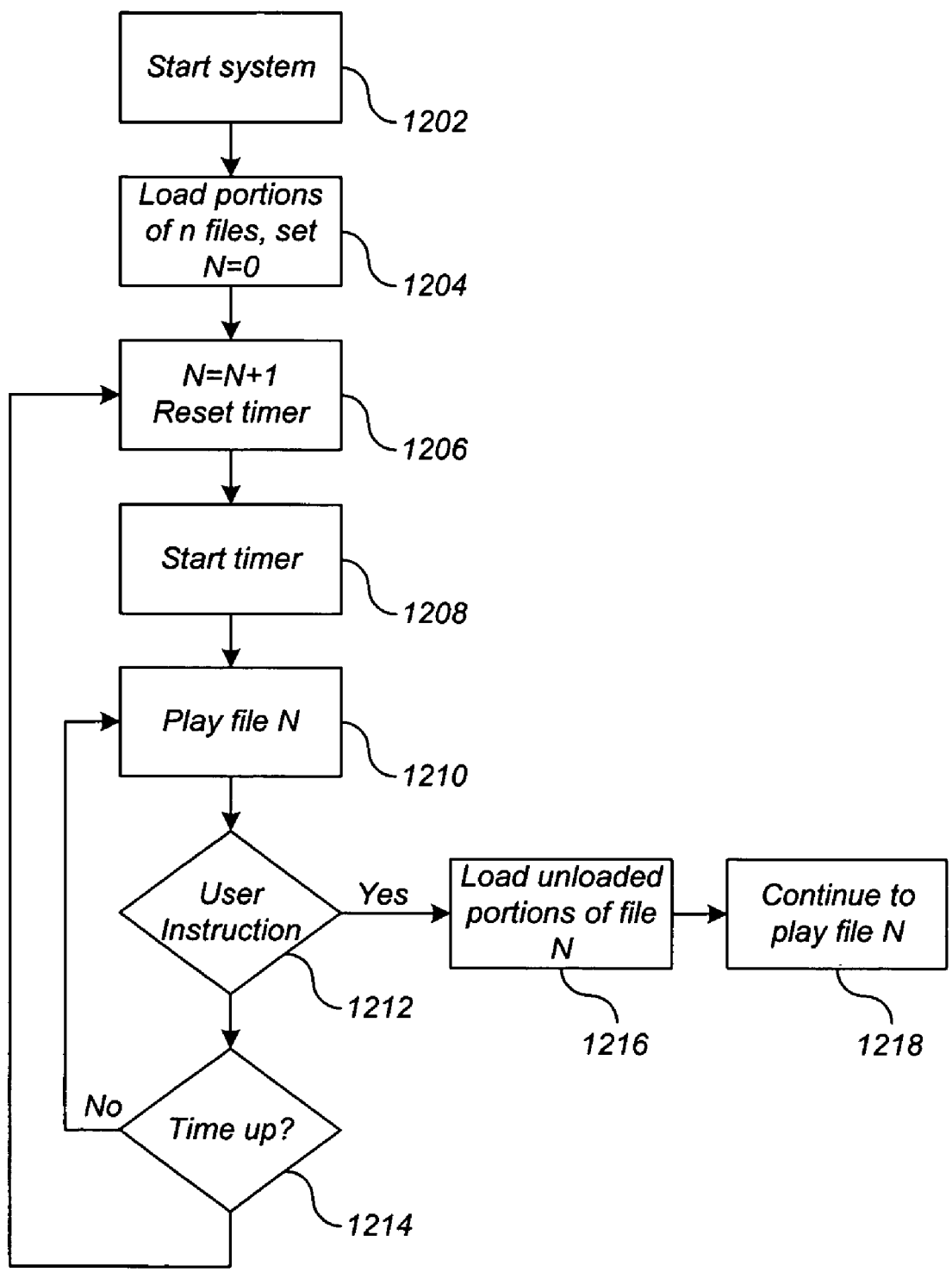
FIG. 12 is flow chart of an operating procedure according to the present invention.

In the simplest implementation, media data representing one selection (such as a single song) is transferred from disk drive 230 to memory 202 for playback. FIG. 8 is a schematic representation of memory 202, and FIG. 12 is a flow chart illustrating an alternate implementation. As shown therein, instead of retrieving just one selection, first portions of multiple selections are transferred from disk drive 230 to memory 202. These multiple selections may include the user's favorite selections, random selections from an external source, or the like (step 1204). When the user starts playing back the selection, a timer is started (step 1208) and the first selection is played back (step 1210). If a user instruction is received (step 1212) to continue playing that selection is received within a predetermined time (step 1214), the remaining portion of the selection is transferred from disk drive 230 to memory 202 (step 1216) for continued play back (step 1218). If the timer times out (step 1214), the first portion of the next selection (step 1206) is played back and the process is repeated for each remaining first portion. Alternatively, instead of using a timer, a memory threshold, as shown in FIG. 8, may be utilized permit playback of the entire current selection if the user instruction is received before the memory being read out goes below the current selection threshold. Otherwise the first portion of the next selection is played back. Of course, the play back of portions of selections 1 through N may be in any order, such as sequential, random and predetermined. If the play back is in sequential order new selections may be transferred from disk drive 230 to memory 202 to replace previously played back selections.

Figure 4:
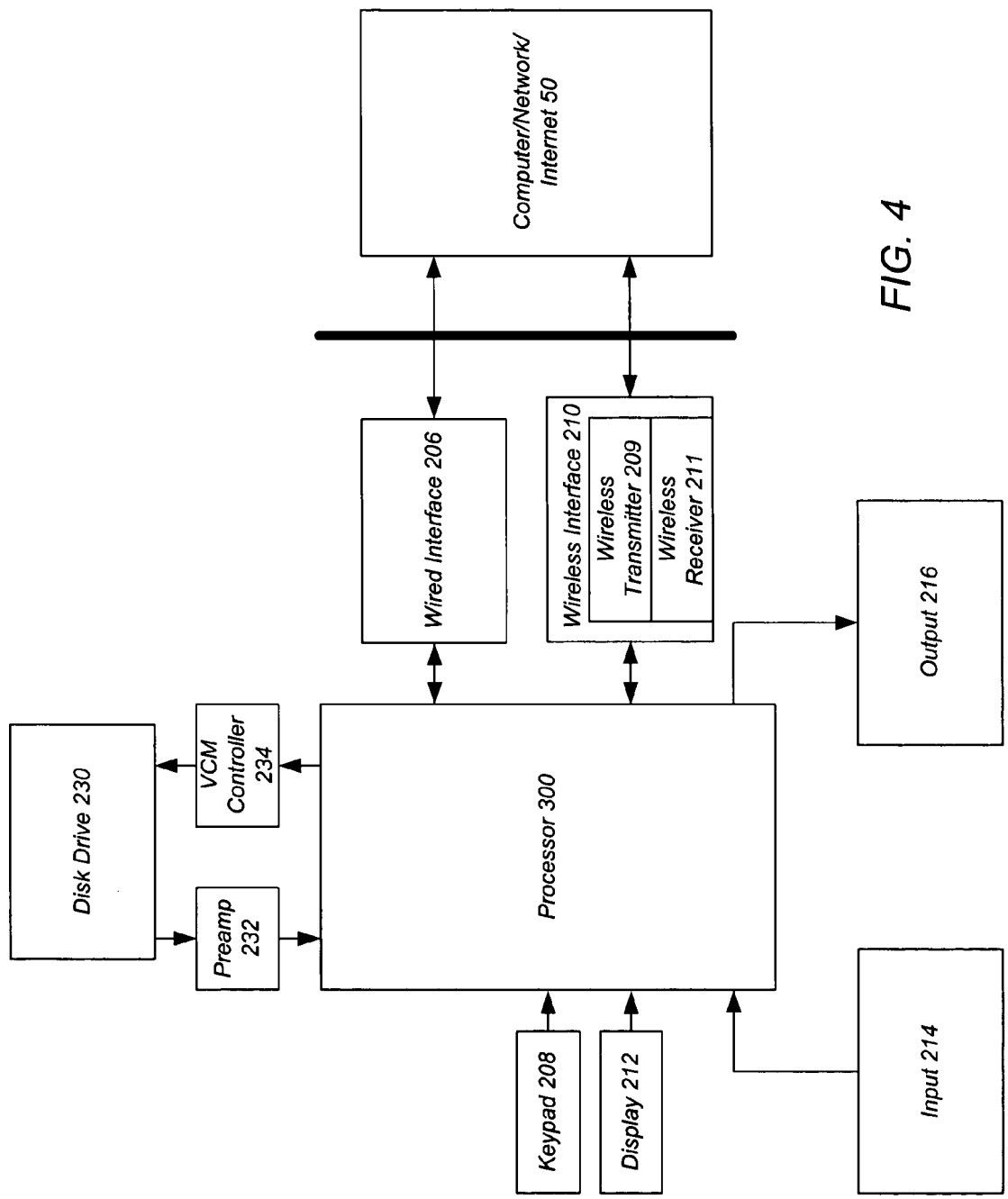
FIG. 4 is a block diagram of a second embodiment of a media player/recorder in accordance with the present invention.
Figure 5:
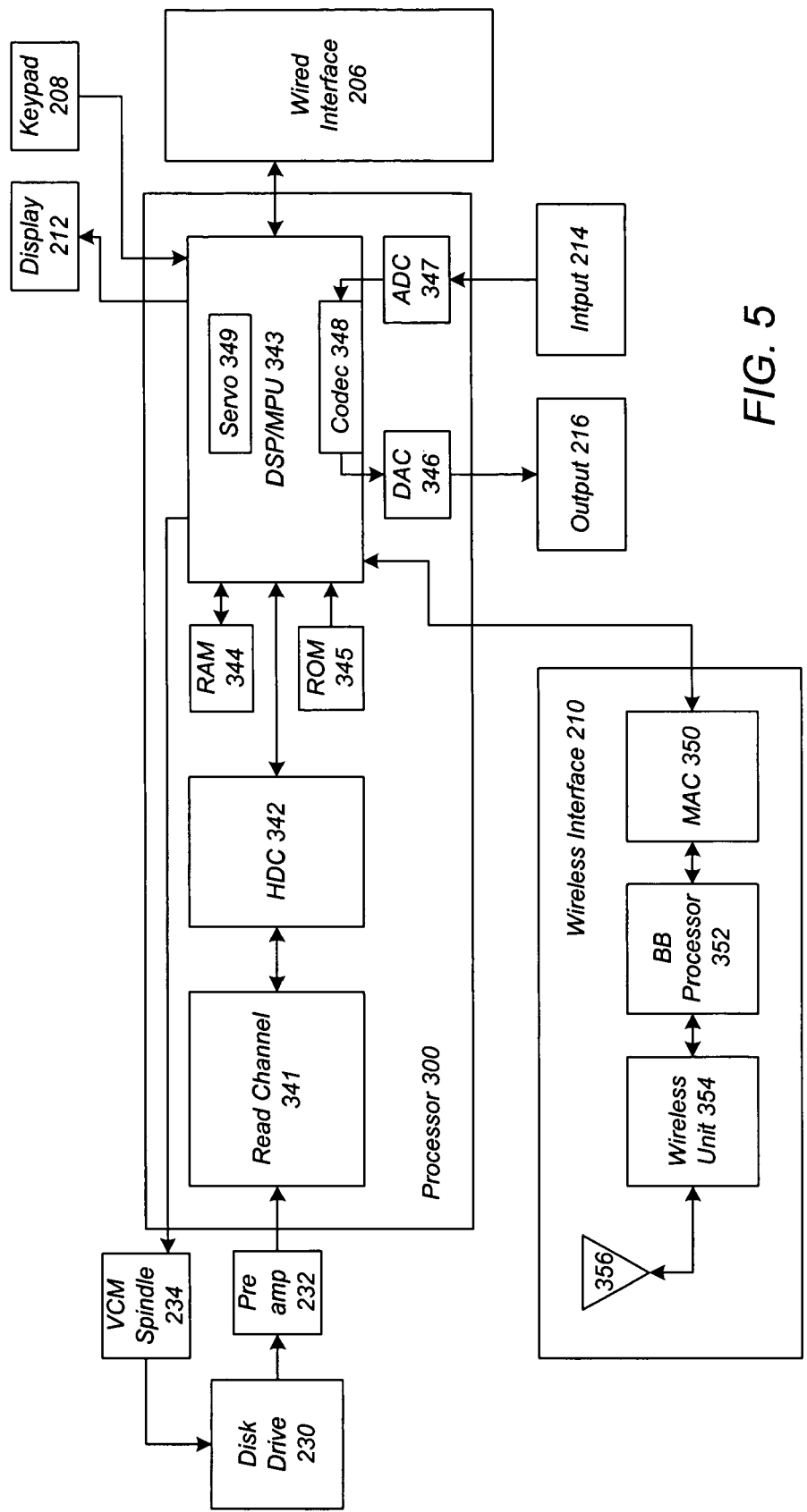
FIG. 5 is a more detailed block diagram of the media player/recorder of FIG. 4.

FIGS. 4 and 5 show a second embodiment of the present invention. The second embodiment is similar to the first embodiment except the second embodiment does not include memory 202. In this embodiment media data is recorded in a similar manner as the first embodiment and no further discussion is provided herein. For playback operation, the media data is retrieved directly from disk drive 230 for playback through output 216. The other portions of the playback operation are similar to the first embodiment. In the second embodiment disk drive 230 will be powered on any time media data is recorded or played back. As such this embodiment is particularly applicable when the power supply is external. For example the media player/recorder of the second embodiment may be a portable device used in an automobile supply by energy therefrom. In some implementations, MAC 350 includes an embedded microprocessor.

Figure 13:
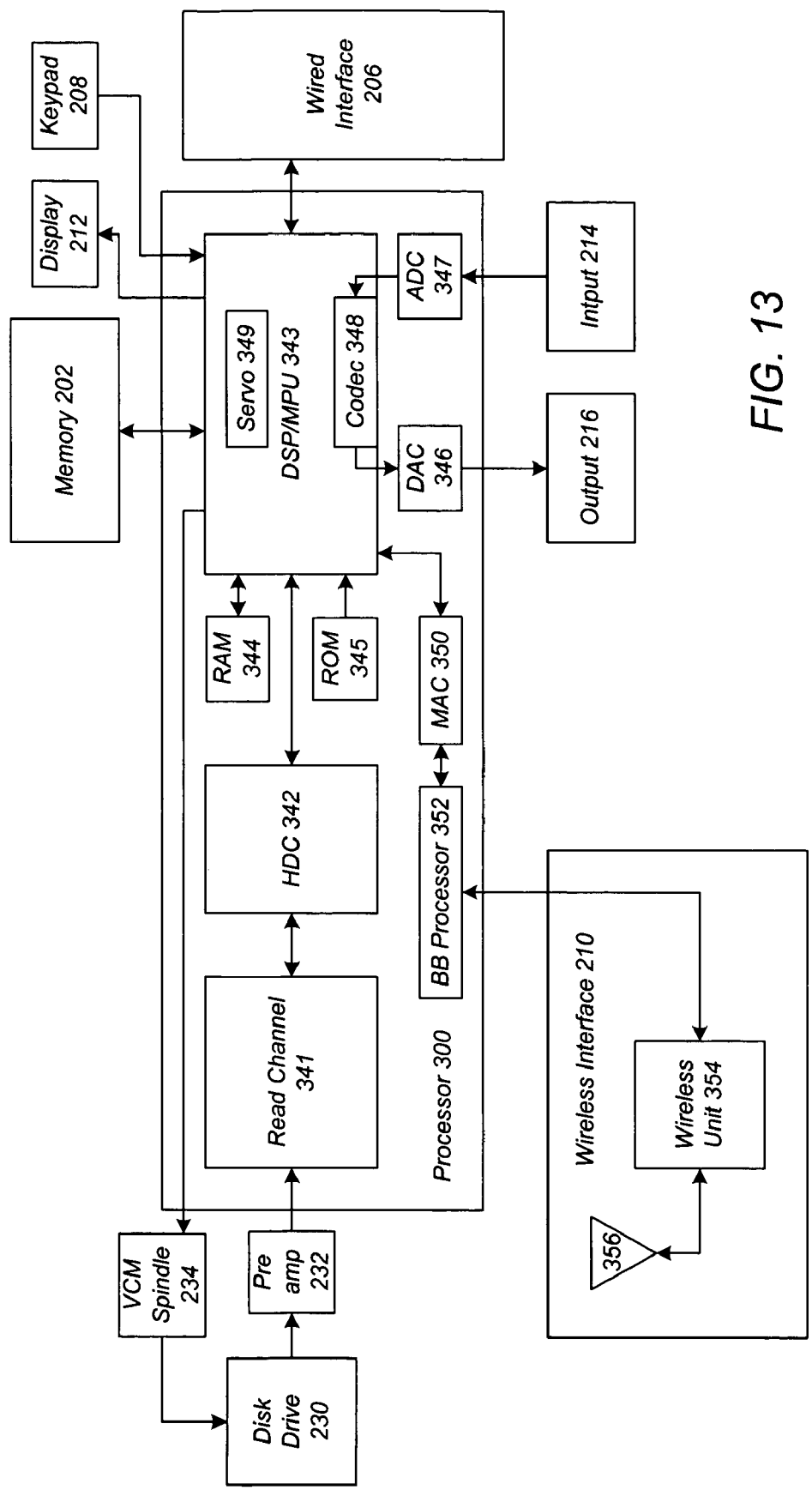
FIG. 13 shows a variation of the first embodiment of the media player/recorder of FIG. 2.

FIG. 13 shows a variation of the first embodiment. According to this variation, baseband processor 352 and MAC 350 are implemented within processor 300, preferably as a single integrated circuit. Wireless interface 210 includes antenna 356 and wireless unit 354. This variation operates as described for the first embodiment. In some implementations, MAC 350 includes an embedded microprocessor.

Figure 14:
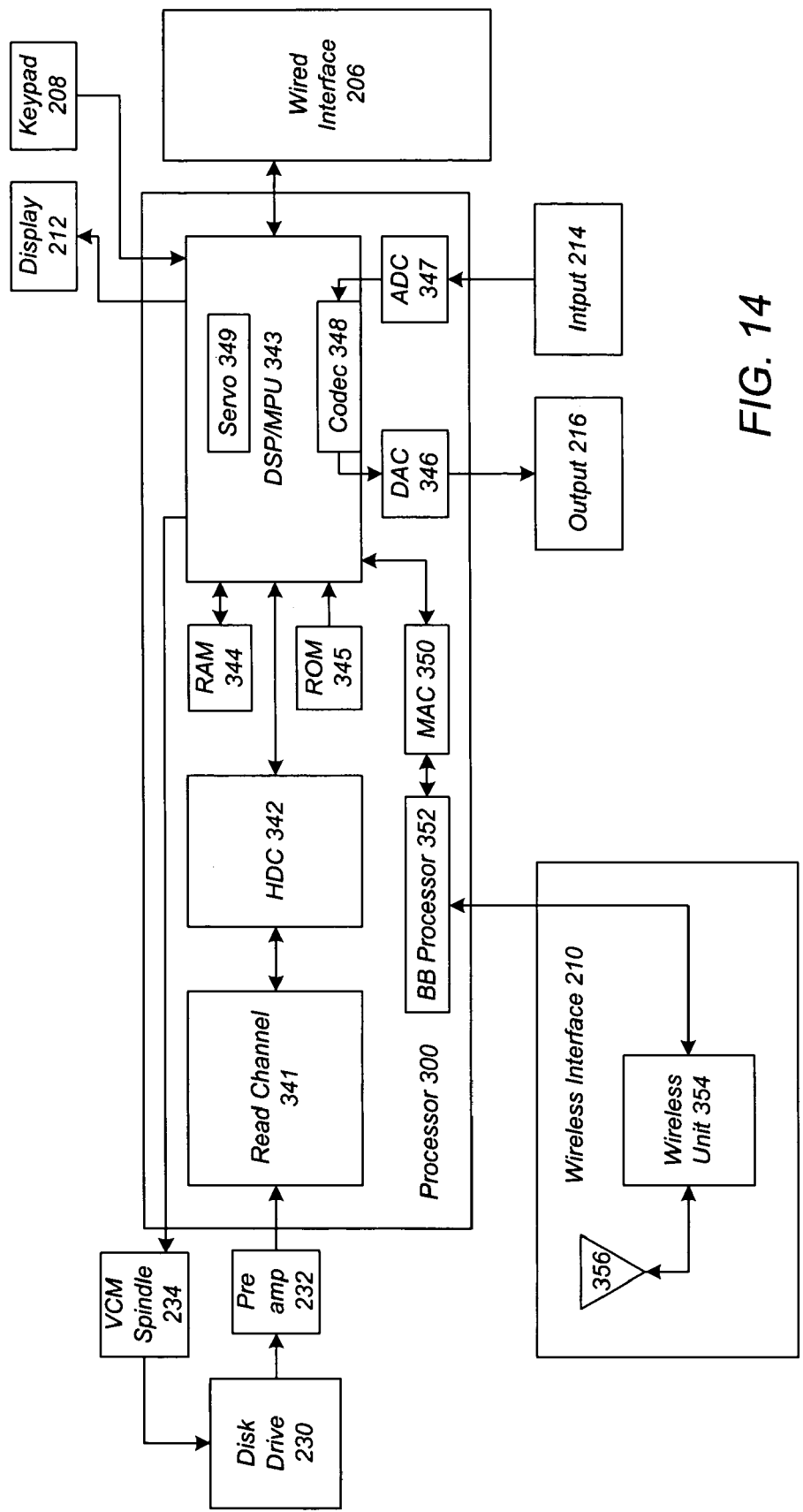
FIG. 14 shows a variation of the second embodiment of the media player/recorder of FIG. 2.

FIG. 14 shows a variation of the second embodiment. According to this variation, baseband processor 352 and MAC 350 are implemented within processor 300, preferably as a single integrated circuit. Wireless interface 210 includes antenna 356 and wireless unit 354. This variation operates as described for the first embodiment. In some implementations, MAC 350 includes an embedded microprocessor.

Figure 15:
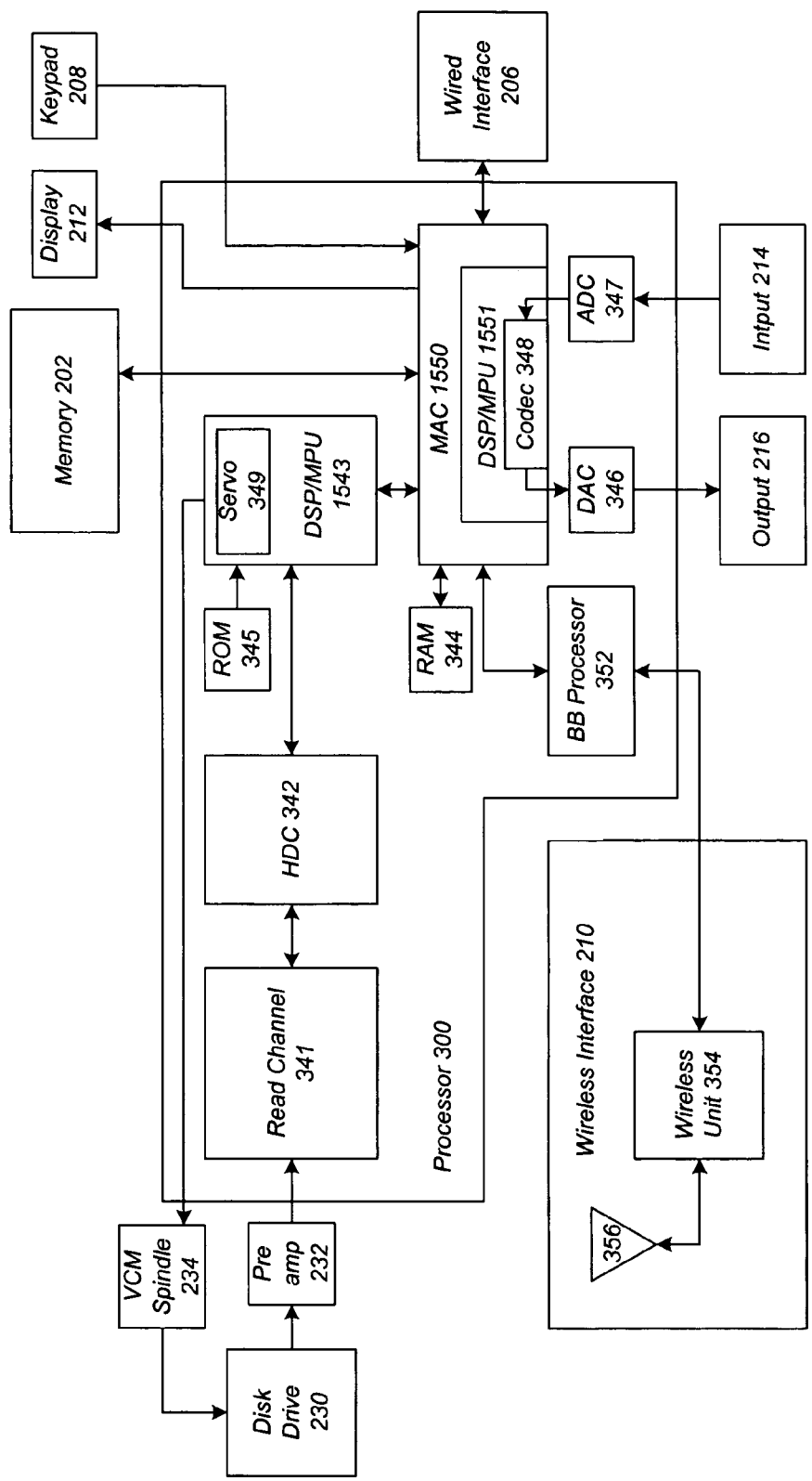
FIG. 15 is a block diagram of a third embodiment of a media player/recorder in accordance with the present invention.

FIG. 15 is a block diagram of a third embodiment of a media player/recorder in accordance with the present invention. According to this embodiment, a MAC 1550 is implemented within processor 300, which is preferably implemented as a single integrated circuit, and includes an embedded digital signal processor and microprocessor unit (DSP/MPU) 1551. DSP/MPU 1551 includes codec 348, and communicates with memory 202, display 212, keypad 208, wired interface 206, RAM 344, DAC 346, and ADC 347, which function as described above with reference to FIG. 3.

DSP/MPU 343 has been replaces with DSP/MPU 1543, which controls disk drive 230, read channel 341, and HDC 342 as described above.

Figure 16:
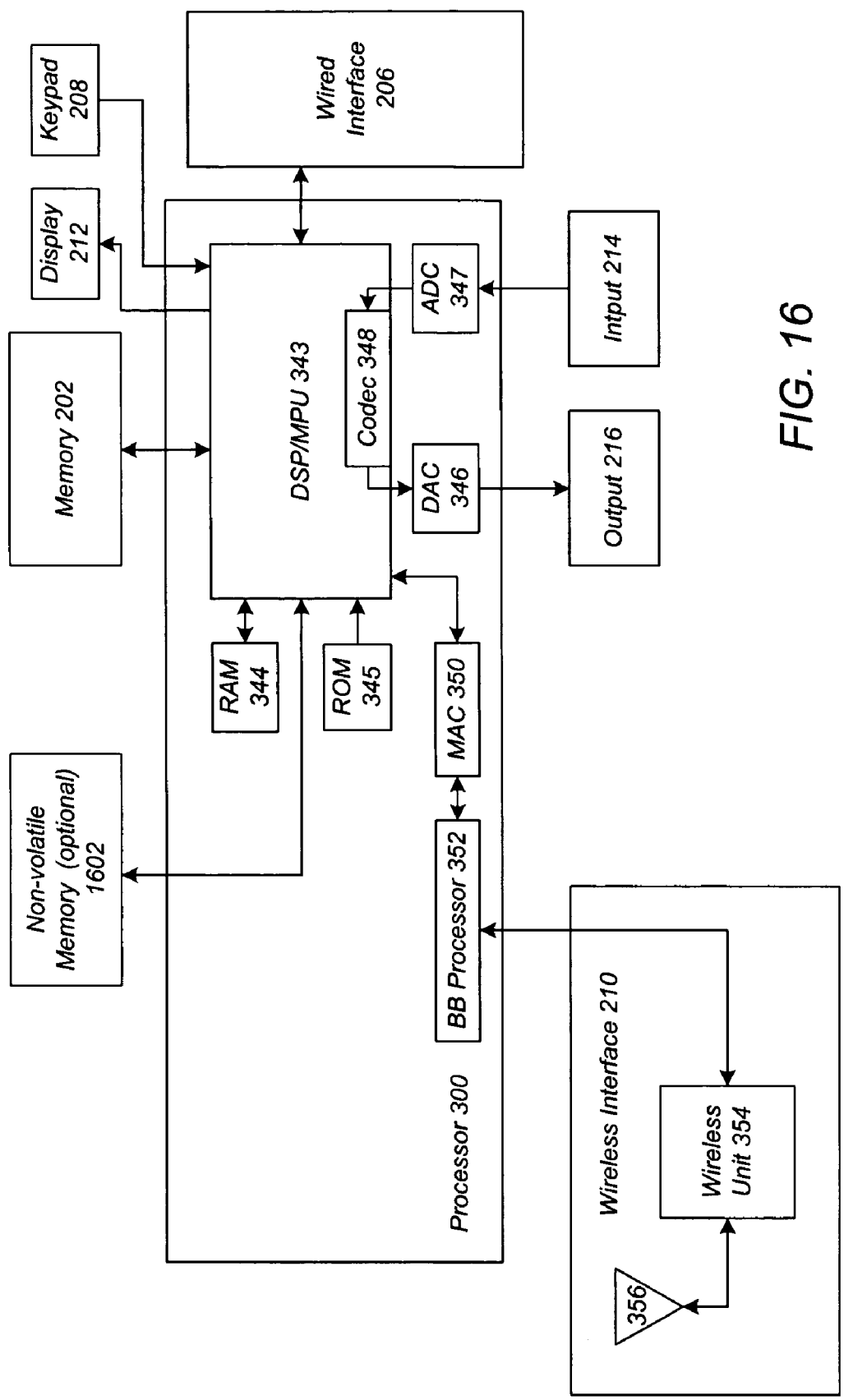
FIG. 16 is a block diagram of a fourth embodiment of a media player/recorder in accordance with the present invention.

FIG. 16 is a block diagram of a fourth embodiment of a media player/recorder in accordance with the present invention. This embodiment is similar to the above embodiments, but has no hard drive. Some implementations of this embodiment optionally include a non-volatile memory 1602 such as a flash memory instead of a hard drive. Consequently the circuits associated with the hard drive are also eliminated, resulting in a less-expensive media player/recorder. In the depicted implementation, baseband processor 352 and MAC 350 are implemented within processor 300, which is preferably implemented as a single integrated circuit. In other implementations, baseband processor 352 and MAC 350 are implemented separately from processor 300, for example, within wireless interface 210. In some implementations, MAC 350 includes an embedded DSP/MPU. These implementations operate in a manner similar to that described for the implementations of FIG. 15.

The implementations using non-volatile memory instead of a hard drive are especially useful for receiving streaming media from broadcasts such as internet radio stations and other media player recorders. Some implementations feature a "broadcast" mode where the media player/recorder plays a media selection and wirelessly transmits the media selection, either compressed or uncompressed, or in analog form, such that other media player/recorders can receive the broadcast media and play it at the same time as the broadcasting player/recorder.

Figure 17:
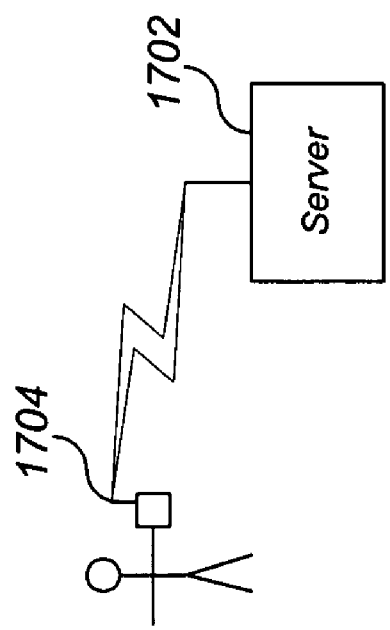
FIG. 17 illustrates a mode of some implementations referred to as "local radio mode."

The implementations with no hard drive or non-volatile memory are especially useful in a "local radio" mode where the media to be played is stored on a personal computer, server, or the like that is separate from the media player/recorder. FIG. 17 illustrates the local radio mode. In this mode, the media is wirelessly streamed to the media player/recorder 1704, which decompresses and plays the media without storing the media. Because the media player/recorder never stores a copy of the media, it is ideal for playing media for which only a single copy is licensed. The single copy is stored on a personal computer (PC) 1702, and is streamed to media player/recorder 1704 for playback. Because only a single copy of the media is stored, the single-copy license is satisfied.

Figure 18:
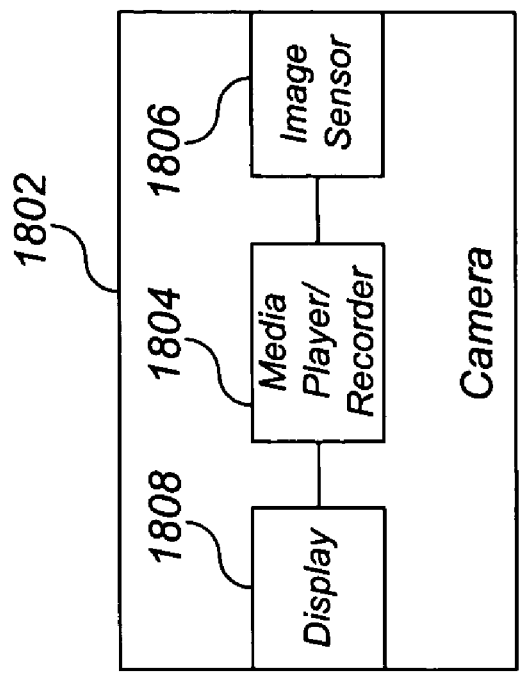
FIG. 18 shows an implementation where a media player/recorder is implemented within a digital camera.

FIG. 18 shows an implementation where a media player/recorder 1804 is implemented within a digital camera 1802. In recording mode, an image sensor 1806 within camera 1802 captures one or more images, and passes a signal representing the image to media player/recorder 1804. If the signal is analog, a analog-to-digital converter within media player/recorder 1804 converts the analog signal to a digital signal. A digital signal processor within media player/recorder 1804 then encodes the digital signal. The encoding can include image compression, image manipulation, and the like. A storage controller within media player/recorder 1804 stores the encoded image data on a storage device. In some implementations, digital camera 1802 is a digital motion picture camera and the encoded image data represents a motion picture.

Figure 19:
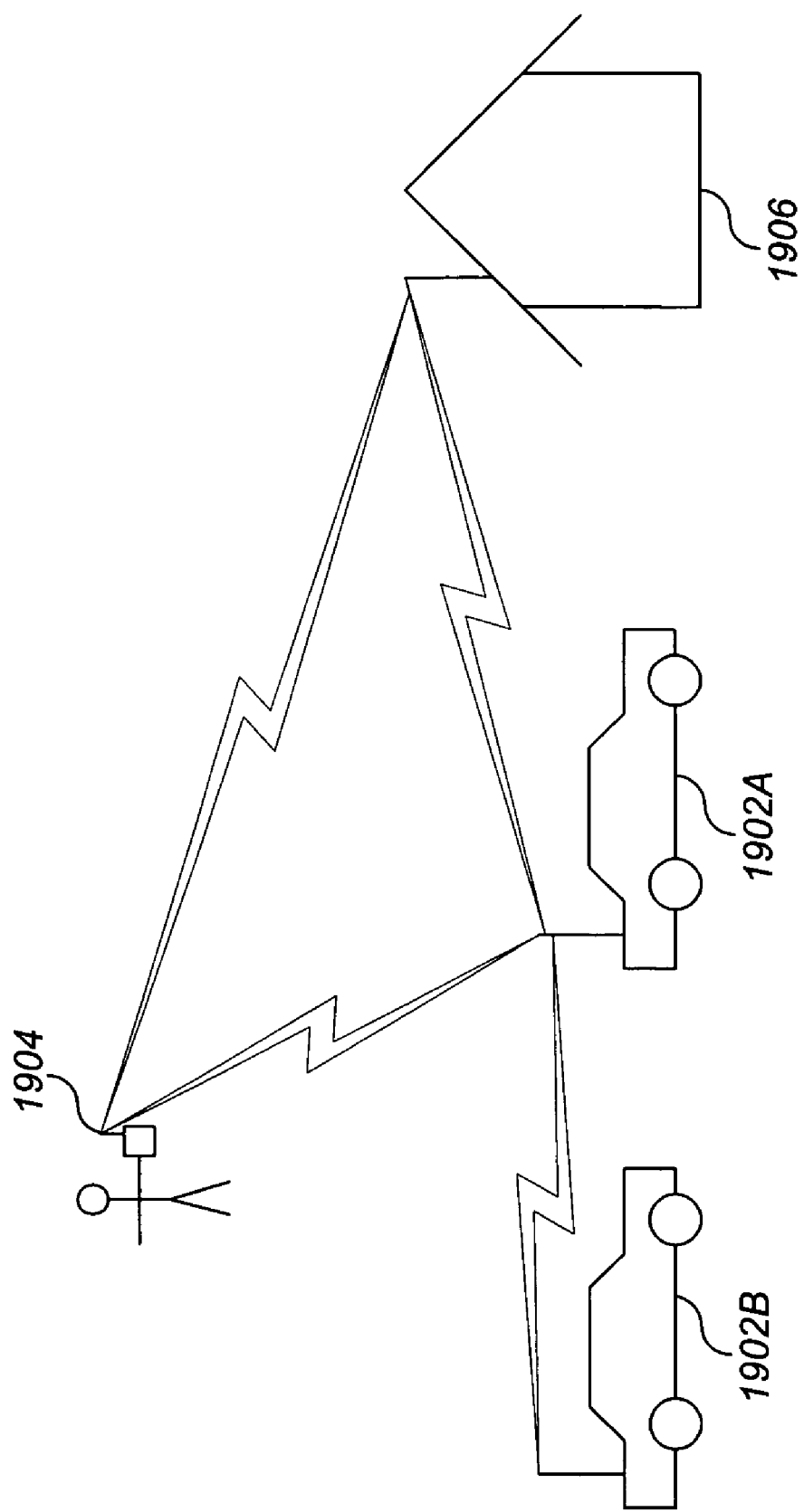
FIG. 19 shows automobiles equipped with a media player/recorder in accordance with the present invention.

In playback mode, the storage controller retrieves the encoded image data from the storage device. The digital signal processor decodes the retrieved encoded image data. Media player/recorder 1804 sends a signal representing the decoded image data to a display 1808, which displays the image(s) captured by image sensor 1806.A The media player/recorder described herein can be implemented as a portable unit, as a permanently mounted unit within a vehicle such as an automobile, and the like. FIG. 19 shows automobiles 1902A and 1902B equipped with such a media player/recorder. In this implementation, the antenna of the automobile can serve as the antenna of the media player/recorder. The media player/recorders in the automobiles 1902 can communicate with each other, without user intervention, while traveling near each other, while stopped at intersections, and in other similar scenarios, to share media data, items of interest, and the like. The media player/recorders in the automobiles 1902 can also communicate with portable media player/recorders 1904 in a similar fashion. The vehicular and portable media player/recorders can communicate with a stationary base station 1906 to share media over a network such as the Internet. For example, a homeowner can equip his garage with such a base station 1906 so the media player/recorder in his automobile can share media and items of interest while parked in the garage during the night. Similarly, a user of a portable player/recorder 1904 can equip his home with a base station 1906 so the media player/recorder 1904 can share media and items of interest while not otherwise in use, for example while the user sleeps.

Some implementations receive and store data other than media data. In some implementations the media player/recorder records biometric data collected by a biometric sensor disposed near, upon, or within a human body or other organism. The biometric data can represent biological functions such as breathing, heart function, body temperature, blood pressure, and the like. Such devices and methods are well-know in the relevant arts, and are described in U.S. Pat. No. 6,023,662 entitled "Measurement Device, Portable Electronic Instrument, And Measurement Method," issued Feb. 8, 2000; U.S. Pat. No. 6,030,342 entitled "Device For Measuring Calorie Expenditure And Device For Measuring Body Temperature," issued Feb. 29, 2000; U.S. Pat. No. 6,036,653 entitled "Pulsimeter," issued Mar. 14, 2000; and U.S. Pat. No. 6,081,742 entitled "Organism State Measuring Device and Relaxation Instructing Device," issued Jun. 27, 2000, the disclosures thereof incorporated by reference herein in their entirety.

Figure 21:
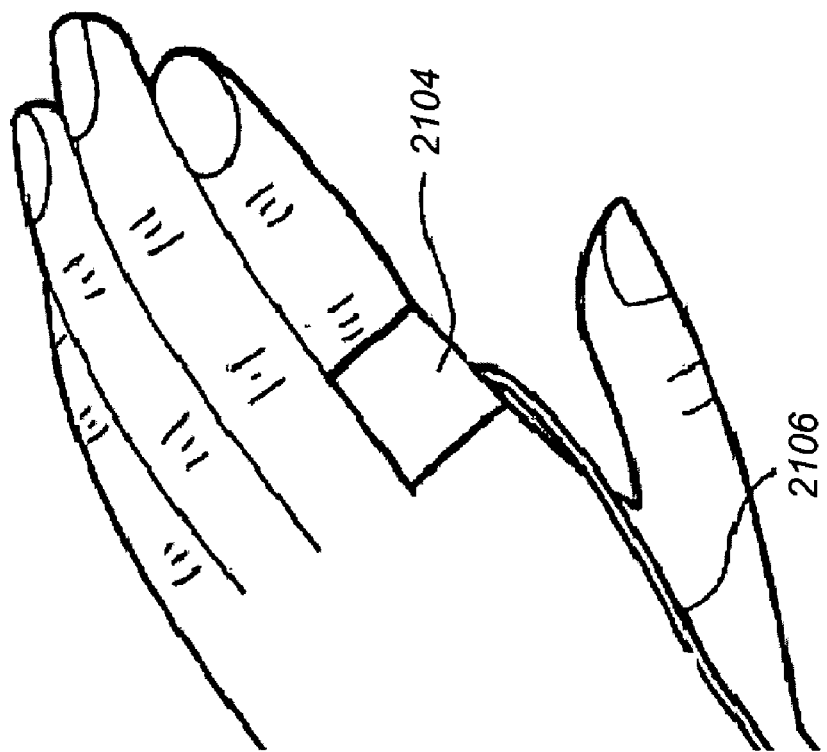
FIG. 21 show a biometric sensor worn on a finger and transmitting biometric data over a cable.
Figure 20:
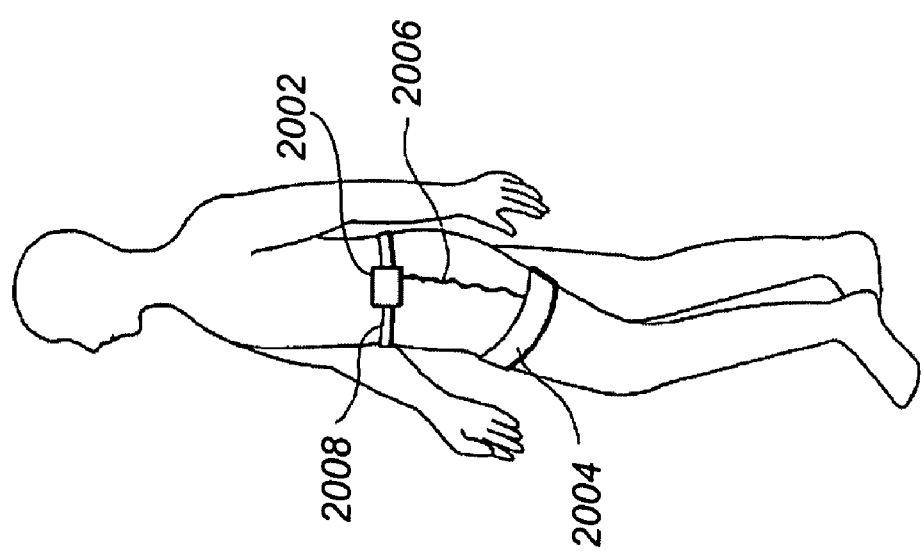
FIG. 20 shows an implementation where a media player/recorder communicates with a biometric sensor over a cable.

FIG. 18 shows an implementation where a media player/recorder 1802 communicates with a biometric sensor 1804 over a cable 1806. The biometric data collected by biometric sensor 1804 is passed to media player/recorder 1802 over cable 1806. Alternatively, the biometric data can be passed to media/player recorder 1802 wirelessly. The data can be passed in analog or digital form, and is received and stored by media/player recorder 1802 according to the methods described above. In FIG. 18 the biometric sensor is worn on the leg. Of course, the biometric sensor can be worn in other locations. FIG. 21 show a biometric sensor 2104 worn on a finger and transmitting biometric data over a cable 2106.

According to these implementations, a user of the media player/recorder can record biometric data for later use in diagnosis and treatment of intermittently occurring medical conditions such as heart arrhythmia. When the user subsequently visits a doctor, the media player/recorder can transmit the stored biometric data to the doctor's computer for analysis, by wire or wirelessly.

Figure 22:
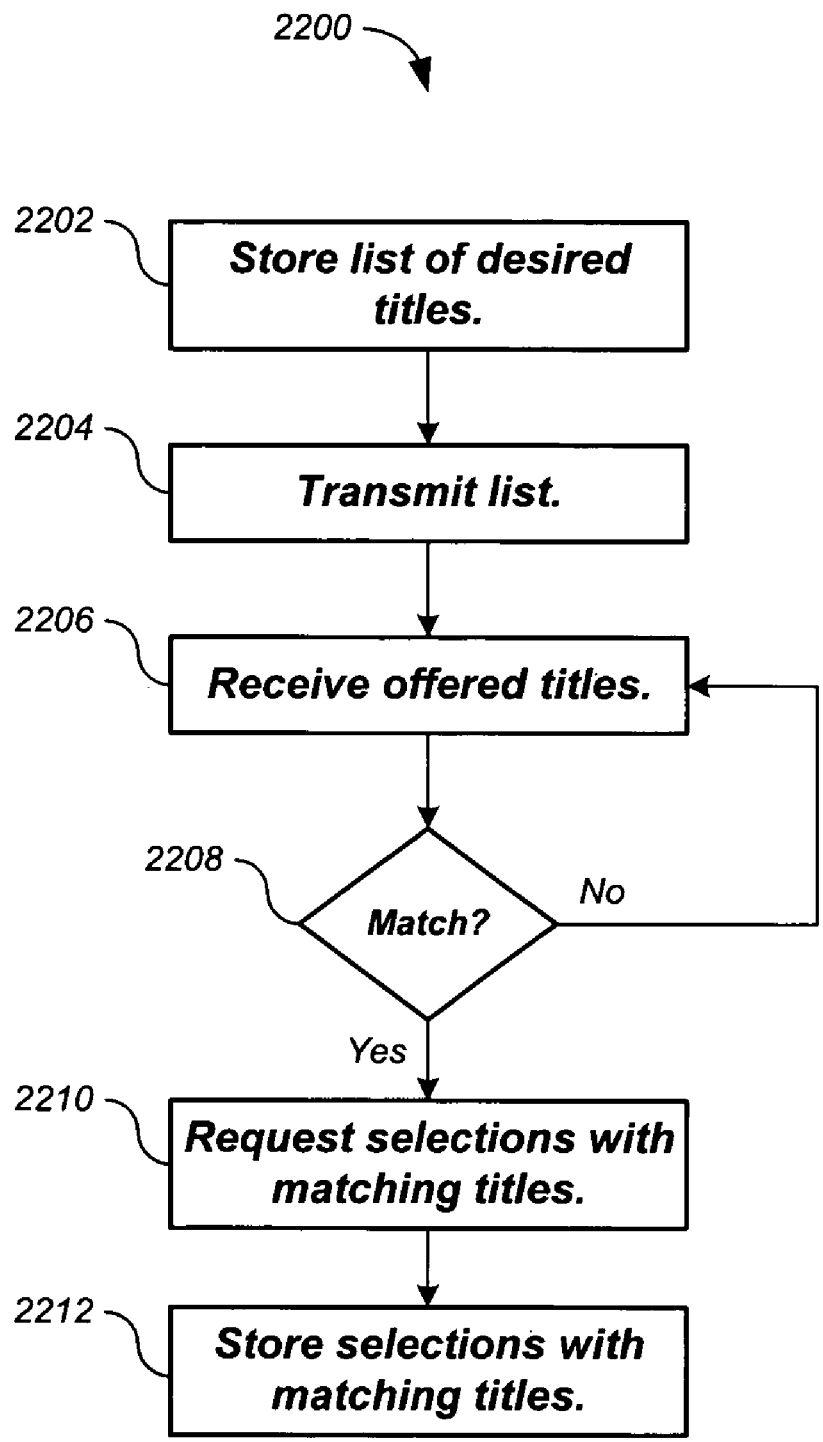
FIG. 22 shows a process for a media player/recorder to acquire shared media.
Figure 23:
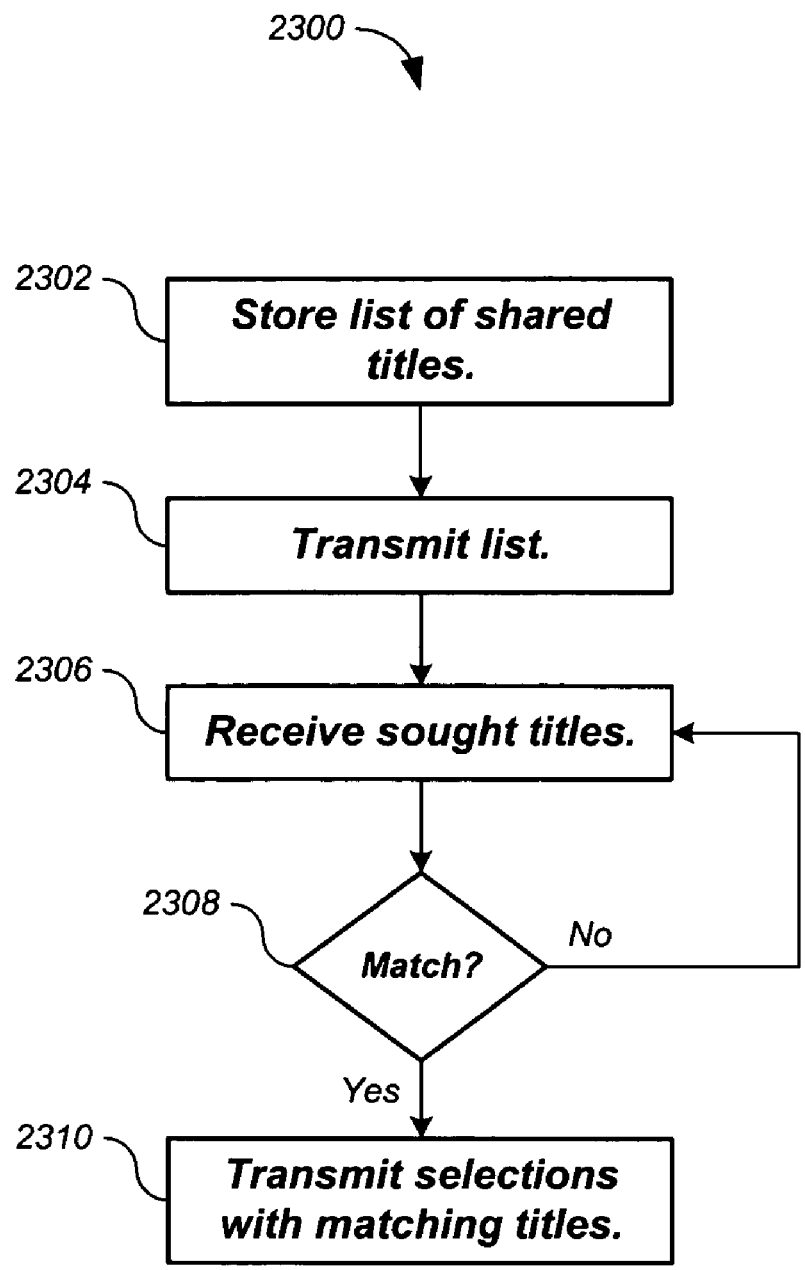
FIG. 23 shows a process for a media player/recorder to share media.

Some implementations feature a "share" mode in which media stored on one media player/recorder can be shared with other media player recorders using wireless data transmissions over wireless interface 210. FIGS. 22 and 23 show methods for such sharing. Of course, media can be shared over wired interface 206 as well using similar methods. However, these methods are well-suited for the relatively lower data rates of wireless links because they require little user intervention. These methods can be used not only to share media between player/recorder units, but also with other repositories of media, such as remote network servers and the like.

FIG. 22 shows a process 2200 for a media player/recorder to acquire shared media. A list of identifiers of desired media selections, such as song titles, is stored within the player/recorder (step 2202). A user can generate the list using the keypad, download the list from a computer, or the like. Optionally, the wireless transmitter can transmit a signal representing the list (step 2204). Other player/recorder units receive the list, and respond by offering media selections on the list. The wireless receiver receives the titles of the offered media selections (step 2206). The offered titles are compared to the desired titles (step 2208). The player/recorder optionally transmits a signal requesting the selections having matching titles (step 2210). Other player/recorders respond by transmitting the requested selections. The player/recorder receives the requested selections, and stores the received selections (step 2212).

The player/recorder can obtain selections shared by a broadcaster that simply transmits a title of a media selection, and then transmits the selection, without first waiting to receive lists of desired titles or requests for media selections having matching titles. In this case optional steps 2204 and 2210 are not needed.

FIG. 23 shows a process 2300 for a media player/recorder to share media. A list of identifiers of shared media selections, such as song titles, is stored within the player/recorder (step 2302). A user can generate the list using the keypad, download the list from a computer, or the like. Optionally, the wireless transmitter can transmit a signal representing the list (step 2304). Other player/recorder units receive the list, and respond by requesting media selections on the list. The wireless receiver receives the titles of the sought media selections (step 2306). The sought titles are compared to the shared titles (step 2308). The player/recorder transmits the selections having matching titles (step 2310).

Figure 24:
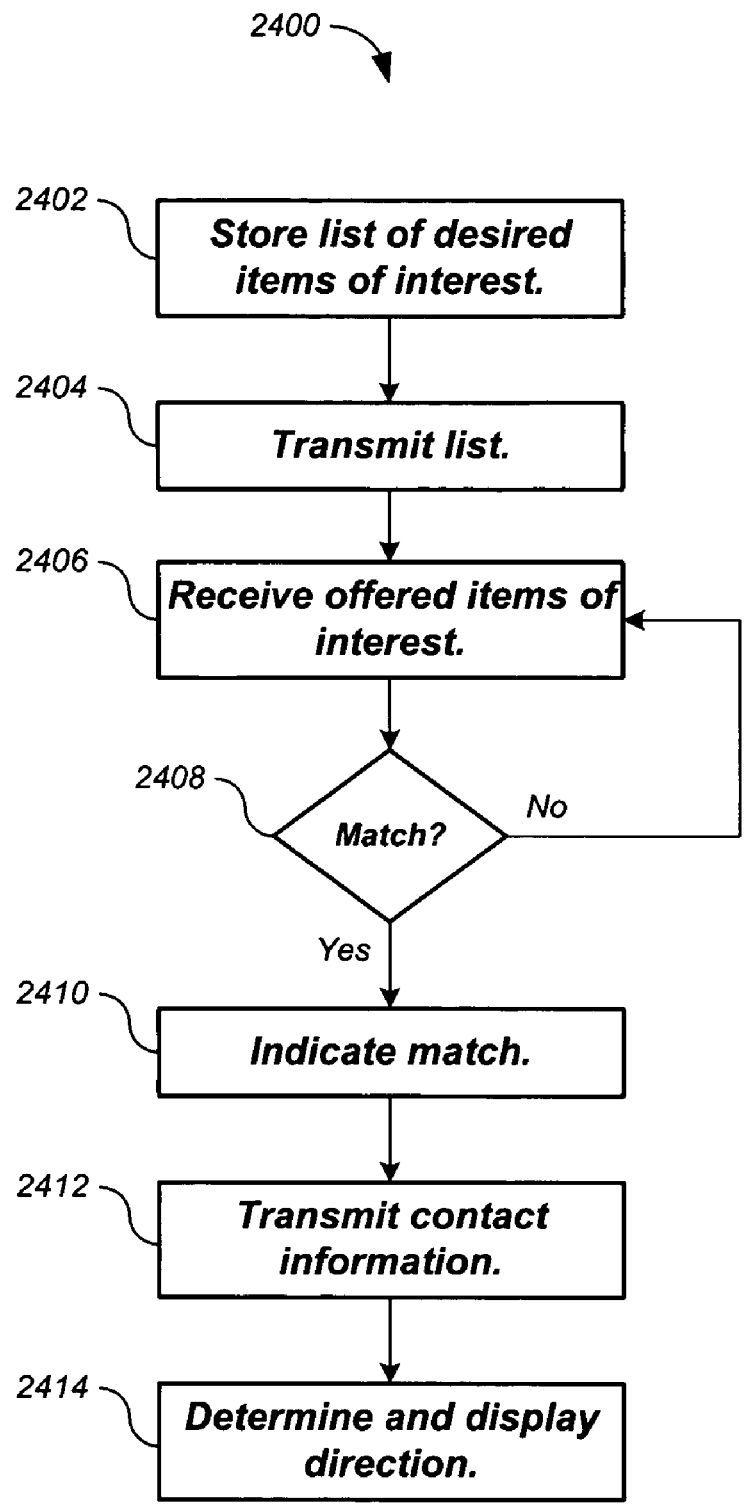
FIG. 24 shows a process for a media player/recorder to match items of interest.

Some implementations feature an "interest matching" mode in which items of interest stored on one media player/recorder can be shared with other media player recorders using wireless data transmissions over wireless interface 220. Items of interest include interests such as hobbies and sports, items for sale or rent, requests for items for sale or rent, musical preferences and the like. When a match is made, the display units indicate the match, and the media player/recorders can wirelessly exchange contact information such as email addresses, telephone numbers and the like. Some implementations include a directional antenna to allow the users having matched items of interest to locate each other. Of course, interests can be matched over wired interface 216 as well using similar methods. FIG. 24 shows methods for such interest matching.

FIG. 24 shows a process 2400 for a media player/recorder to match items of interest. A list of desired items of interest is stored within the player/recorder (step 2402). A user can generate the list using the keypad, download the list from a computer, or the like. Optionally, the wireless transmitter can transmit a signal representing the list (step 2404). The wireless receiver receives offered items of interest from other player/recorders (step 2406). The offered items of interest are compared to the desired items of interest (step 2408). When compared items of interest match, the display unit indicates a match (step 2410). Optionally the player/recorder transmits contact information to the transmitter of the offered item of interest (step 2412). Optionally, the player/recorder determines and displays a direction to the transmitter of the offered item of interest (step 2414). The player/recorder can also include a range finder circuit to determine a range to the transmitter of the offered item of interest, which is then displayed.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An integrated circuit to control a media player/recorder having a wireless receiver, a storage device, and an output circuit, wherein the wireless receiver receives a signal representing encoded media data, the integrated circuit comprising:

a programmable processor operable to execute program instructions stored in a memory, the programmable processor comprising:

a digital signal processor to obtain the encoded media data from the signal representing the encoded media data, and a storage controller responsive to the digital signal processor to store the encoded media data in the storage device;

a read channel responsive to the storage controller to read the encoded media data from the storage device;

wherein the digital signal processor comprises a decoder to decode the retrieved encoded media data; and a digital-to-analog converter to convert the media data decoded by the decoder to an analog signal, wherein the analog signal is output to the output circuit;
the storage device stores a list of identifiers of desired encoded media selections;
the wireless receiver receives a signal representing an identifier of an offered encoded media selection; and
the digital signal processor causes the storage device to store the offered encoded media selection when the identifier of the offered encoded media selection corresponds to the identifier of one of the desired encoded media sections.

2. The integrated circuit of claim 1, wherein:
the media data is encoded by a process that compresses the media data; and
the encoded media data is decoded by a process that decompresses the media data.

3. The integrated circuit of claim 1, wherein the storage device stores a process for decoding the encoded media data for a selected code.

4. The integrated circuit of claim 3,
wherein the digital signal processor determines a code of the encoded media data retrieved by the digital signal processor;
wherein the process for decoding the encoded media data is retrieved from the storage device in accordance with the determined code; and
wherein the decoder decodes the encoded media data in accordance with the retrieved process.

5. The integrated circuit of claim 1, wherein the media player/recorder has an input circuit to receive unencoded media data,
wherein the digital signal processor comprises an encoder to encode the unencoded media data; and
wherein the encoded media data encoded by the digital signal processor is stored on the storage device.

6. The integrated circuit of claim 1, wherein the media player/recorder has a wireless transmitter, and wherein the digital signal processor causes the wireless transmitter to transmit the encoded media data while the analog signal is output to the output circuit.

7. The integrated circuit of claim 1, wherein the media player/recorder has a wireless transmitter, and wherein the digital signal processor causes the wireless transmitter to transmit a signal representing the identifiers of the desired encoded media selections.

8. An integrated circuit to control a media player/recorder having a wireless receiver, a storage device, and an output circuit, wherein the wireless receiver receives a signal representing encoded media data, the integrated circuit comprising:
a programmable processor operable to execute program instructions stored in a memory, the programmable processor comprising:
a digital signal processor to obtain the encoded media data from the signal representing the encoded media data, and
a storage controller responsive to the digital signal processor to store the encoded media data in the storage device;
a read channel responsive to the storage controller to read the encoded media data from the storage device;
wherein the digital signal processor comprises a decoder to decode the retrieved encoded media data; and
a digital-to-analog converter to convert the media data decoded by the decoder to an analog signal,
wherein the analog signal is output to the output circuit;
wherein the storage device stores a list of identifiers of shared encoded media selections stored on the storage device;
wherein the wireless receiver receives a signal representing a request for a sought encoded media selection, the request including an identifier of the sought encoded media selection; and
wherein the digital signal processor causes the wireless transmitter to transmit one of the shared encoded media selections when the identifier of the sought encoded media selection corresponds to the identifier of the one of the shared encoded media selections.

9. The integrated circuit of claim 8, wherein the digital signal processor causes the wireless transmitter to transmit a signal representing the identifiers of the shared encoded media selections.

10. The integrated circuit of claim 1,
wherein the media player/recorder receives a signal representing biometric data; and
wherein the digital signal processor causes the storage device to store the biometric data.

11. The integrated circuit of claim 10, wherein the media player/recorder has an interface, and wherein the digital signal processor causes the interface to transmit a signal representing the biometric data stored on the storage device.

12. An integrated circuit to control a media player/recorder having a wireless receiver, a storage device, and an output circuit, wherein the wireless receiver receives a signal representing encoded media data, the integrated circuit comprising:
a programmable processor operable to execute program instructions stored in a memory, the programmable processor comprising:
a digital signal processor to obtain the encoded media data from the signal representing the encoded media data, and
a storage controller responsive to the digital signal processor to store the encoded media data in the storage device;
a read channel responsive to the storage controller to read the encoded media data from the storage device;
wherein the digital signal processor comprises a decoder to decode the retrieved encoded media data; and
a digital-to-analog converter to convert the media data decoded by the decoder to an analog signal,
wherein the analog signal is output to the output circuit;
wherein the storage device stores a list of desired items of interest;
wherein the wireless receiver receives a signal representing an offered item of interest; and
wherein the digital signal processor causes the display unit to indicate a match when the offered item of interest corresponds to one of the desired items of interest.

13. The integrated circuit of claim 12, wherein the media player/recorder has a directional antenna,
wherein the digital signal processor uses the directional antenna to determine a direction to a transmitter of the signal representing the offered item of interest; and
wherein the digital signal processor causes the display unit to display the direction.

14. The integrated circuit of claim 13, wherein the media player/recorder has a wireless transmitter, and wherein the digital signal processor causes the wireless transmitter to transmit contact information to the transmitter of the signal representing the offered item of interest.

15. The integrated circuit of claim 14, wherein the digital signal processor causes the wireless transmitter to transmit a signal representing the desired items of interest.

16. The integrated circuit of claim 1, wherein the media player/recorder is implemented within a digital camera having an image sensor:
wherein the digital signal processor encodes image data representing an image captured by the image sensor; and
wherein the storage controller stores the encoded image data on the storage device.

17. The integrated circuit of claim 16, wherein the digital camera further comprises a display, wherein:
the storage controller retrieves the encoded image data from the storage device;
the digital signal processor decodes the retrieved encoded image data; and
the digital signal processor sends a signal representing the decoded image data to the display.

18. The integrated circuit of claim 16, wherein the digital camera is a digital motion picture camera and the encoded image data represents a motion picture.

19. An integrated circuit to control a media player/recorder having a wireless receiver, a storage device, and an output circuit, wherein the wireless receiver receives a signal representing encoded media data, the integrated circuit comprising:
programmable processor means for executing program instructions stored in a memory comprising:
digital signal processor means for obtaining the encoded media data from the signal representing the encoded media data, and
storage controller means responsive to the digital signal processor means for storing the encoded media data in the storage device;
read channel means responsive to the storage controller means for reading the encoded media data from the storage device;
wherein the digital signal processor means comprises decoder means for decoding the retrieved encoded media data; and
digital-to-analog converter means for converting the media data decoded by the decoder means to an analog signal,
wherein the analog signal is output to the output circuit,
wherein the storage device stores a list of identifiers of desired encoded media selections and wherein the wireless receiver receives a signal representing an identifier of an offered encoded media selection, and
wherein the digital signal processor means causes the storage device to store the offered encoded media selection when the identifier of the offered encoded media selection corresponds to the identifier of one of the desired encoded media selections.

20. The integrated circuit of claim 19, wherein:
the media data is encoded by a process that compresses the media data; and
the encoded media data is decoded by a process that decompresses the media data.

21. The integrated circuit of claim 19, wherein the storage device stores a process for decoding the encoded media data for a selected code,
wherein the digital signal processor means determines a code of the encoded media data retrieved by the digital signal processor;
wherein the process for decoding the encoded media data is retrieved from the storage device in accordance with the determined code; and
wherein the decoder means decodes the encoded media data in accordance with the retrieved process.

22. The integrated circuit of claim 19, wherein the media player/recorder has an input circuit to receive unencoded media data,
wherein the digital signal processor means comprises encoder means for encoding the unencoded media data; and
wherein the encoded media data encoded by the digital signal processor means is stored on the storage device.

23. The integrated circuit of claim 19, wherein the media player/recorder has a wireless transmitter, and wherein the digital signal processor means causes the wireless transmitter to transmit the encoded media data while the analog signal is output to the output circuit.

24. The integrated circuit of claim 19, wherein the media player/recorder has a wireless transmitter,
wherein the digital signal processor means causes the wireless transmitter to transmit a signal representing the identifiers of the desired encoded media selections.

25. An integrated circuit to control a media player/recorder having a wireless receiver, a storage device, and an output circuit, wherein the wireless receiver receives a signal representing encoded media data, the integrated circuit comprising:
programmable processor means for executing program instructions stored in a memory comprising:
digital signal processor means for obtaining the encoded media data from the signal representing the encoded media data, and
storage controller means responsive to the digital signal processor means for storing the encoded media data in the storage device;
read channel means responsive to the storage controller means for reading the encoded media data from the storage device;
wherein the digital signal processor means comprises decoder means for decoding the retrieved encoded media data; and
digital-to-analog converter means for converting the media data decoded by the decoder means to an analog signal,
wherein the analog signal is output to the output circuit,
wherein the media player/recorder has a wireless transmitter, wherein the storage device stores a list of identifiers of shared encoded media selections stored on the storage device, and wherein the wireless receiver receives a signal representing a request for a sought encoded media selection, the request including an identifier of the sought encoded media selection, and
wherein the digital signal processor means causes the wireless transmitter to transmit one of the shared encoded media selections when the identifier of the sought encoded media selection corresponds to the identifier of the one of the shared encoded media selections.

26. The integrated circuit of claim 25, wherein the digital signal processor means causes the wireless transmitter to transmit a signal representing the identifiers of the shared encoded media selections.

27. The integrated circuit of claim 19, wherein the media player/recorder receives a signal representing biometric data, wherein the digital signal processor means causes the storage device to store the biometric data.

28. The integrated circuit of claim 27, wherein the media player/recorder has an interface, wherein the digital signal processor means causes the interface to transmit a signal representing the biometric data stored on the storage device.

29. An integrated circuit to control a media player/recorder having a wireless receiver, a storage device, and an output circuit, wherein the wireless receiver receives a signal representing encoded media data, the integrated circuit comprising:
programmable processor means for executing program instructions stored in a memory comprising:
digital signal processor means for obtaining the encoded media data from the signal representing the encoded media data, and
storage controller means responsive to the digital signal processor means for storing the encoded media data in the storage device;
read channel means responsive to the storage controller means for reading the encoded media data from the storage device;
wherein the digital signal processor means comprises decoder means for decoding the retrieved encoded media data; and
digital-to-analog converter means for converting the media data decoded by the decoder means to an analog signal,
wherein the analog signal is output to the output circuit,
wherein the media player/recorder has a display unit, wherein the storage device stores a list of desired items of interest, and wherein the wireless receiver receives a signal representing an offered item of interest, and
wherein the digital signal processor means causes the display unit to indicate a match when the offered item of interest corresponds to one of the desired items of interest.

30. The integrated circuit of claim 29, wherein the media player/recorder has a directional antenna,
wherein the digital signal processor means uses the directional antenna to determine a direction to a transmitter of the signal representing the offered item of interest; and
wherein the digital signal processor means causes the display unit to display the direction.

31. The integrated circuit of claim 30, wherein the media player/recorder has a wireless transmitter,
wherein the digital signal processor means causes the wireless transmitter to transmit contact information to the transmitter of the signal representing the offered item of interest.

32. The integrated circuit of claim 31, wherein the digital signal processor means causes the wireless transmitter to transmit a signal representing the desired items of interest.

33. The integrated circuit of claim 19, wherein the integrated circuit is implemented within a digital camera having an image sensor:
wherein the digital signal processor means encodes image data representing an image captured by the image sensor; and
wherein the storage controller means stores the encoded image data on the storage device.

34. The integrated circuit of claim 33, wherein the digital camera further comprises a display, wherein:
the storage controller means retrieves the encoded image data from the storage device;
the digital signal processor means decodes the retrieved encoded image data; and
the integrated circuit sends a signal representing the decoded image data to the display.

35. The integrated circuit of claim 33, wherein the digital camera is a digital motion picture camera and the encoded image data represents a motion picture.

36. A method for controlling a media player/recorder having a wireless receiver, a storage device, and an output circuit, wherein the wireless receiver receives a signal representing encoded media data, the method comprising:
obtaining the encoded media data from the signal representing the encoded media data,
wherein the storage device stores a list of identifiers of desired encoded media selections and wherein, the wireless receiver receives a signal representing an identifier of an offered encoded media selection;
causing the storage devices to store the offered encoded media selection when the identifier of the offered encoded media selection corresponds to the identifier of one of the desired encoded media selections;
using a processor for storing the encoded media data in the storage device;
using the same processor that is used for said storing, for reading the encoded media data from the storage device;
decoding the retrieved encoded media data;
converting the decoded media data to an analog signal; and
outputting the analog signal to the output circuitry; and
playing back the analog signal with the output circuit.

37. The method of claim 36, wherein:
the media data is encoded by a process that compresses the media data; and
the encoded media data is decoded by a process that decompresses the media data.

38. The method of claim 36, wherein the storage device stores a process for decoding the encoded media data for a selected code, and further comprising:
determining a code of the encoded media data retrieved by the processor;
retrieving the process for decoding the encoded media data from the storage device in accordance with the determined code; and
decoding the encoded media data in accordance with the retrieved process.

39. The method of claim 36, wherein the media player/recorder has an input circuit to receive unencoded media data, further comprising:
encoding the unencoded media data; and
causing the storage device to store the unencoded media data.

40. The method of claim 36, wherein the media player/recorder has a wireless transmitter, further comprising wirelessly transmitting the encoded media data while the analog signal is output to the output circuit.

41. The method of claim 36, wherein the media player/recorder has a wireless transmitter, further comprising:
causing the wireless transmitter to transmit a signal representing the identifiers of the desired encoded media selections.

42. A method for controlling a media player/recorder having a wireless receiver, a storage device, and an output circuit, wherein the wireless receiver receives a signal representing encoded media data, the method comprising:
obtaining the encoded media data from the signal representing the encoded media data,
using a processor for storing the encoded media data in the storage device;

using the same processor that is used for said storing, for reading the encoded media data from the storage device;
decoding the retrieved encoded media data;
converting the decoded media data to an analog signal; and
outputting the analog signal to the output circuitry; and
playing back the analog signal with the output circuit,
wherein the media player/recorder has a wireless transmitter, wherein the storage device stores a list of identifiers of shared encoded media selections stored on the storage device, and wherein the wireless receiver receives a signal representing a request for a sought encoded media selection, the request including an identifier of the sought encoded media selection; and
causing the wireless transmitter to transmit one of the shared encoded media selections when the identifier of the sought encoded media selection corresponds to the identifier of the one of the shared encoded media selections.

43. The method of claim 42, further comprising:
causing the wireless transmitter to transmit a signal representing the identifiers of the shared encoded media selections.

44. The method of claim 36, wherein the media player/recorder receives a signal representing biometric data, further comprising:
causing the storage device to store the biometric data.

45. The method of claim 44, wherein the media player/recorder has an interface, further comprising:
causing the interface to transmit a signal representing the biometric data stored on the storage device.

46. A method for controlling a media player/recorder having a wireless receiver, a storage device, and an output circuit, wherein the wireless receiver receives a signal representing encoded media data, the method comprising:
obtaining the encoded media data from the signal representing the encoded media data,
using a processor for storing the encoded media data in the storage device;
using the same processor that is used for said storing, for reading the encoded media data from the storage device;
decoding the retrieved encoded media data;
converting the decoded media data to an analog signal; and
outputting the analog signal to the output circuit; and
wherein the media player/recorder has a display unit, wherein the storage device stores a list of desired items of interest, and wherein the wireless receiver receives a signal representing an offered item of interest; and
causing the display unit to indicate a match when the offered item of interest corresponds to one of the desired items of interest.

47. The method of claim 46, further comprising:
determining a direction to a transmitter of the signal representing the offered item of interest; and
causing the display unit to display the direction.

48. The method of claim 47, wherein the media player/recorder has a wireless transmitter, further comprising:
causing the wireless transmitter to transmit contact information to the transmitter of the signal representing the offered item of interest.

49. The method of claim 48, further comprising:
causing the wireless transmitter to transmit a signal representing the desired items of interest.

50. The method of claim 36, wherein the media player/recorder is implemented within a digital camera having an image sensor, further comprising:
encoding image data representing an image captured by the image sensor; and
storing the encoded image data on the storage device.

51. The method of claim 50, wherein the digital camera further comprises a display, further comprising:
retrieving the encoded image data from the storage device;
decoding the retrieved encoded image data; and
sending a signal representing the decoded image data to the display.

52. The method of claim 50, wherein the digital camera is a digital motion picture camera and the encoded image data represents a motion picture.

53. Computer-readable media embodying instructions executable by a computer to perform a method for controlling a media player/recorder having a wireless receiver, a storage device, and an output circuit, wherein the wireless receiver receives a signal representing encoded media data, the instructions causing the computer to carry out operations comprising:
obtaining the encoded media data from the signal representing the encoded media data,
wherein the storage device stores a list of identifiers of desired encoded media selections, and wherein the wireless receiver receives a signal representing an identifier of an offered encoded media selection;
causing the storage device to store the offered encoded media selection when the identifier of the offered encoded media selection corresponds to the identifier of one of the desired encoded media selections;
using a processor for storing the encoded media data in the storage device;
using the same processor that is used for said storing, for reading the encoded media data from the storage device;
decoding the retrieved encoded media data;
converting the decoded media data to an analog signal;
outputting the analog signal to the output circuit; and
playing back the analog signal with the output circuit.

54. The media of claim 53, wherein:
the media data is encoded by a process that compresses the media data; and
the encoded media data is decoded by a process that decompresses the media data.

55. A media as in claim 53, further comprising determining a code of the encoded media data retrieved by the processor;
retrieving the process for decoding the encoded media data from the storage device in accordance with the determined code; and
decoding the encoded media data in accordance with the retrieved process.

56. The media of claim 53, wherein the media player/recorder has an input circuit to receive unencoded media data, wherein the method further comprises:
encoding the unencoded media data; and
causing the storage device to store the unencoded media data.

57. The media of claim 53, wherein the media player/recorder has a wireless transmitter, further comprising wirelessly transmitting the encoded media data while the analog signal is output to the output circuit.

58. The media of claim 53, wherein the media player/recorder has a wireless transmitter, wherein the method further comprises:

causing the wireless transmitter to transmit a signal representing the identifiers of the desired encoded media selections.

59. Computer-readable media embodying instructions executable by a computer to perform a method for controlling a media player/recorder having a wireless receiver, a storage device, and an output circuit, wherein the wireless receiver receives a signal representing encoded media data, the method comprising:

obtaining the encoded media data from the signal representing the encoded media data, using a processor for storing the encoded media data in the storage device;

using the same processor that is used for said storing, for reading the encoded media data from the storage device;

decoding the retrieved encoded media data;

converting the decoded media data to an analog signal; and outputting the analog signal to the output circuit;

playing back the analog signal with the output circuit and wherein the media player/recorder has a wireless transmitter, wherein the storage device stores a list of identifiers of shared encoded media selections stored on the storage device, and wherein the wireless receiver receives a signal representing a request for a sought encoded media selection, the request including an identifier of the sought encoded media selection; and, causing the wireless transmitter to transmit one of the shared encoded media selections when the identifier of the sought encoded media selection corresponds to the identifier of the one of the shared encoded media selections.

60. The media of claim 59, wherein the method further comprises:

causing the wireless transmitter to transmit a signal representing the identifiers of the shared encoded media selections.

61. The media of claim 53, wherein the media player/recorder receives a signal representing biometric data, wherein the method further comprises:

causing the storage device to store the biometric data.

62. The media of claim 61, wherein the media player/recorder has an interface, wherein the method further comprises:

causing the interface to transmit a signal representing the biometric data stored on the storage device.

63. Computer-readable media embodying instructions executable by a computer to perform a method for controlling a media player/recorder having a wireless receiver, a storage device, and an output circuit, wherein the wireless receiver receives a signal representing encoded media data, the method comprising:

obtaining the encoded media data from the signal representing the encoded media data, using a processor for storing the encoded media data in the storage device;

using the same processor that is used for said storing, for reading the encoded media data from the storage device;

decoding the retrieved encoded media data;

converting the decoded media data to an analog signal; and outputting the analog signal to the output circuit;

playing back the analog signal with the output circuit and wherein the media player/recorder has a display unit, wherein the storage device stores a list of desired items of interest, and wherein the wireless receiver receives a signal representing an offered item of interest; and, causing the display unit to indicate a match when the offered item of interest corresponds to one of the desired items.

64. The media of claim 63, wherein the method further comprises:

determining a direction to a transmitter of the signal representing the offered item of interest; and causing the display unit to display the direction.

65. The media of claim 64, wherein the media player/recorder has a wireless transmitter, wherein the method further comprises:

causing the wireless transmitter to transmit contact information to the transmitter of the signal representing the offered item of interest.

66. The media of claim 65, wherein the method further comprises:

causing the wireless transmitter to transmit a signal representing the desired items of interest.

67. The media of claim 53, wherein the media player/recorder is implemented within a digital camera having an image sensor, wherein the method further comprises:

encoding image data representing an image captured by the image sensor; and storing the encoded image data on the storage device.

68. The media of claim 67, wherein the digital camera further comprises a display, wherein the method further comprises:

retrieving the encoded image data from the storage device;

decoding the retrieved encoded image data; and sending a signal representing the decoded image data to the display.

69. The media of claim 67, wherein the digital camera is a digital motion picture camera and the encoded image data represents a motion picture.

70. An integrated circuit to control a media player/recorder having a wireless receiver, a storage device, and an output circuit, wherein the wireless receiver receives a signal representing encoded media data, the integrated circuit comprising:

a programmable processor operable to execute program instructions stored in a memory comprising:

a media access controller to obtain the encoded media data from the signal; and a digital signal processor to decode the encoded media data obtained by the media access controller; and a digital-to-analog converter to convert the media data decoded by the digital signal processor to an analog signal, wherein the analog signal is output to the output circuit;

the storage device stores a list of identifiers of desired encoded media selections;

the wireless receiver receives a signal representing an of an offered encoded media selection; and the digital signal processor causes the storage device to store the offered encoded media selection when the identifier of the offered encoded media selection corresponds to the identifier of one of the desired encoded media selections.

71. The integrated circuit of claim 70, wherein:

the media data is encoded by a process that compresses the media data; and the encoded media data is decoded by a process that decompresses the encoded media data.

72. The integrated circuit of claim 70, wherein the digital signal processor comprises a decoder to decode the encoded media data obtained by the media access controller.

73. The integrated circuit of claim 72,
wherein the digital signal processor determines a code of the encoded media data obtained by the media access controller; and
wherein the decoder decodes the encoded media data in accordance with the determined code.

74. An integrated circuit to control a media player/recorder having a wireless receiver, a storage device, and an output circuit, wherein the wireless receiver receives a signal representing encoded media data, the integrated circuit comprising:
a programmable processor operable to execute program instructions stored in a memory comprising:
a media access controller to obtain the encoded media data from the signal; and
a digital signal processor to decode the encoded media data obtained by the media access controller; and
a digital-to-analog converter to convert the media data decoded by the digital signal processor to an analog signal,
wherein the analog signal is output to the output circuit;
wherein the storage device stores a list of identifiers of desired encoded media selections and wherein, the wireless receiver receives a signal representing an identifier of an offered encoded media selection, and
wherein the digital signal processor causes the storage devices to store the offered encoded media selection when the identifier of the offered encoded media selection corresponds to the identifier of one of the desired encoded media selections.

75. The integrated circuit of claim 74, wherein:
the media data is encoded by a process that compresses the media data; and
the encoded media data is decoded by a process that decompresses the encoded media data.

76. The integrated circuit of claim 74, wherein the digital signal processor means comprises decoder means for decoding the encoded media data obtained by the media access controller means.

77. The integrated circuit of claim 76,
wherein the digital signal processor means determines a code of the encoded media data obtained by the media access controller means; and
wherein the decoder means decodes the encoded media data in accordance with the determined code.

78. A method for controlling a media player/recorder having a wireless receiver, a storage device, and an output circuit, wherein the wireless receiver receives a signal representing encoded media data, the method comprising:
a.) obtaining the encoded media data from the signal representing the encoded media data,
wherein a process for decoding the encoded media data for a selected code are stored in the storage device;
b.) determining a code of the encoded media data;
c.) retrieving the process for decoding the encoded media data from the storage device in accordance with the determined code;
d.) decoding the encoded media data in accordance with the retrieved process;
e.) converting the decoded media data to an analog signal; and
f.) outputting the analog signal to the output circuit;
g.) playing the analog signal with the output circuit,
wherein the media player/recorder does not store the encoded media data, wherein the storage device stores a list of identifiers of desired encoded media selections and wherein the wireless receiver receives a signal representing an identifier of an offered encoded media selection; and
h.) causing the storage device to store the offered encoded media selection when the identifier, of the offered encoded media selection corresponds to the identifier of one of the desired encoded media selections.

79. The method of claim 78, wherein the media data is encoded by a process that compresses the media data, and
wherein the encoded media data is decoded by a process that decompresses the encoded media data.

80. Computer-readable media embodying instructions executable by a computer to perform a method for controlling a media player/recorder having a wireless receiver, a storage device, and an output circuit, wherein the wireless receiver receives a signal representing encoded media data, the method comprising:
a.) obtaining the encoded media data from the signal representing the encoded media data,
wherein a process for decoding the encoded media data for a selected code are stored in the storage device;
b.) determining a code of the encoded media data;
c.) retrieving the process for decoding the encoded media data from the storage device in accordance with the determined code;
d.) decoding the encoded media data in accordance with the retrieved process;
e.) converting the decoded media data to an analog signal; and
f.) outputting the analog signal to the output circuit;
g.) playing the analog signal with the output circuit,
wherein the media player/recorder does not store the encoded media data, wherein the storage device stores a list of identifiers of desired encoded media selections and wherein the wireless receiver receives a signal representing an identifier of an offered encoded media selection; and
h.) causing the storage device to store the offered encoded media selection when the identifier, of the offered encoded media selection corresponds to the identifier of one of the desired encoded media selections.

81. The method of claim 80, wherein the media data is encoded by a process that compresses the media data, and
wherein the encoded media data is decoded by a process that decompresses the encoded media data.

* * * * *

UNITED STATES PATENT AND TRADEMARK OFFICE
CERTIFICATE OF CORRECTION

PATENT NO.         : 7,315,764 B1                                    Page 1 of 1
APPLICATION NO. : 10/184299
DATED                : January 1, 2008
INVENTOR(S)       : Sehat Sutardja et al.

It is certified that error appears in the above-identified patent and that said Letters Patent is hereby corrected as shown below:

Item 56 Other Publications

| | |
|---|---|
| Title Page 2 | In the IEEE P802.11g/D8.2 reference, Delete "Readd" and insert -- Reaff -- |
| Title Page 2 | In the IEEE Std. 802.11h reference delete "ITTT" and insert -- IEEE -- |
| Column 1, Line 42 | Insert -- be -- after "can" |
| Column 1, Line 56 | Insert -- with -- after "accordance" |
| Column 2, Line 40 | Delete "the" and insert -- The -- |
| Column 5, Line 47 | Delete "contemplate" and insert -- contemplated -- |
| Column 8, Line 53 | Delete "described" and insert -- describe -- |
| Column 9, Line 11 | Delete "the amount data stored" after "stored" |
| Column 9, Line 17 | Insert -- written -- after "being" |
| Column 9, Line 54 | Delete "form" and insert -- from -- |
| Column 10, Line 16 | Insert -- to -- after "utilized" |
| Column 11, Line 1 | Delete "replaces" and insert -- replaced -- |
| Column 11, Line 65 | Delete "A" after "1806" |
| Column 12, Line 62 | Insert -- / -- between player and recorders |
| Column 12, Line 65 | Insert -- as -- after "well" |
| Column 13, Line 41 | Insert -- / -- between player and recorders |
| Column 13, Line 52 | Insert -- as -- after "well" |
| Column 24, Line 58-59 | Delete "of an" after "an" |

Signed and Sealed this

Twenty-fourth Day of June, 2008

JON W. DUDAS
*Director of the United States Patent and Trademark Office*